US005562277A

United States Patent [19]

Swann et al.

[11] Patent Number: 5,562,277
[45] Date of Patent: Oct. 8, 1996

[54] MODULAR VISE-LIKE WORKHOLDING SYSTEM

[75] Inventors: George R. Swann, Gibsonia; James L. Hartman; James B. Krebs, both of Pittsburgh, all of Pa.

[73] Assignee: Chick Machine Tool, Inc., Warrendale, Pa.

[21] Appl. No.: 300,611

[22] Filed: Sep. 2, 1994

[51] Int. Cl.⁶ .................................................. B25B 1/20
[52] U.S. Cl. .................. 269/43; 269/63; 269/88; 269/152; 269/242; 269/309; 269/900
[58] Field of Search ................. 269/43, 152, 242, 269/282, 283, 309, 310, 900, 906, 63, 64, 88, 304; 74/813 R; 29/33 J, 35.5, 36, 38 B; 409/219, 222

[56] References Cited

U.S. PATENT DOCUMENTS

| | | | |
|---|---|---|---|
| 731,871 | 6/1903 | Echols . | |
| 2,339,986 | 1/1944 | Engert | 90/56 |
| 2,369,425 | 2/1945 | Becker | 90/59 |
| 2,406,043 | 8/1946 | Sorensen | 33/174 |
| 2,535,450 | 12/1950 | O'Malley et al. | 81/33 |
| 2,707,419 | 5/1955 | Schron | 269/152 |
| 2,764,047 | 9/1956 | Allbritton | 269/283 |
| 3,020,998 | 2/1962 | Webb | 198/210 |
| 4,098,500 | 7/1978 | Lenz | 269/136 |
| 4,413,818 | 11/1983 | Lenz | 269/81 |
| 4,524,655 | 6/1985 | Waldron et al. | 82/36 |
| 4,529,183 | 7/1985 | Krason et al. | 269/43 |
| 4,585,217 | 4/1986 | Erickson | 269/56 |
| 4,643,411 | 2/1987 | Izumi | 269/153 |
| 4,884,474 | 12/1989 | Kawata | 74/813 L |
| 4,898,371 | 2/1990 | Mills et al. | 269/136 |
| 4,921,378 | 5/1990 | Kytölä | 409/221 |
| 4,934,674 | 6/1990 | Bernstein | 269/43 |
| 4,963,559 | 6/1990 | Diaz Torga | 269/69 |
| 4,968,012 | 11/1990 | Haddad et al. | 269/88 |
| 4,991,463 | 2/1991 | Kawata | 74/817 |
| 5,022,636 | 6/1991 | Swann | 269/43 |
| 5,064,321 | 11/1991 | Barnes | 409/219 |
| 5,094,436 | 11/1991 | Stephan, III | 269/153 |
| 5,098,073 | 3/1992 | Lenz | 269/43 |
| 5,442,844 | 8/1995 | Swann | 269/43 |
| 5,501,123 | 3/1996 | Swann et al. | 269/43 |

OTHER PUBLICATIONS

Chick Vise Fixturing Brochure, Chick Machine Tool Inc. 1992.
Chick Multi–Lok/8 Brochure, Chick Machine Company, Inc. 1989.
Chick Multi–Lok Workholding For Your Mazak Brochure, Chick Machine Tool Inc., 1992.
Chick Multi–Lok; The Workholding System For Your Tsugami Brochure, Chick Machine Tool Inc., 1992.
Chick Multi–Dex Brochure, Chick Machine Tool Inc., 1993.
Chick Quick Change Workholding Brochure, Chick Machine Tool Inc., 1993.
Chick M–Series Brochure, Chick Machine Tool, Inc., Aug. 1993.
Hoffman, Edward G., Modular Fixturing, Manufacturing Technology Press, pp. 21, 65, 66, 109–117.
Endicon Precision Index and Coupling Rings Brochure, ITW Spiroid, 1987.

Primary Examiner—Robert C. Watson
Assistant Examiner—Thomas W. Lynch
Attorney, Agent, or Firm—Kirkpatrick & Lockhart LLP

[57] ABSTRACT

A workholding system comprising dissimilar support members, each adapted to interchangeably operably support at least one vise-like clamping assembly in a plurality of workholding orientations relative to a support member. One support member arrangement can non-movably support a plurality of vise-like clamping assemblies relative to the support member. Another support member can indexably support a plurality of vise-like clamping assemblies such that they can be selectively indexed about a common axis.

4 Claims, 16 Drawing Sheets

MODULAR VISE-LIKE WORKHOLDING SYSTEM

BACKGROUND OF THE INVENTION

1. Field of the Invention

The present invention relates to workholding apparatuses and, more particularly, is directed to a modular collection of apparatuses adapted to interchangeably support at least one vise-like clamping assembly therein to create a variety of different workholding apparatuses.

2. Description of the Invention Background

Today, most modern machine shops are typically equipped with one or more computer numerically controlled ("CNC") machining apparatuses which can perform very precise machining operations on "workpiece(s)" at very high speeds. However, because such CNC machining devices typically cost several thousands of dollars and require a substantial economic investment to support their operation, it is desirable to keep that equipment operating as close to one hundred percent of the time as possible. The time that a CNC machining device remains idle while workpieces are being handled or manipulated to other machining orientations represents a loss in efficiency of use of the machine and, ultimately, a loss in the profitability of the workpieces or an increase in their cost.

A single CNC machine can generally perform a variety of different "machining" operations on a workpiece. For example, a CNC milling machine can be utilized for many machining operations including producing flat ends on workpieces, producing planar surfaces on workpieces, and drilling, tapping, and reaming holes in workpieces. A typical CNC milling machine is equipped with a vertically or horizontally mounted spindle that has a tool holder attached thereto. The tool holder is constructed to operably receive and support a tool therein which may comprise an end mill for producing flat ends, a flycutter for producing planar surfaces, a drill for drilling holes, a tap for producing threaded holes or a reamer for sizing holes to very precise dimensions.

Such milling machines are equipped with a milling table that is adapted to support workpieces or workpiece-supporting apparatuses commonly known as "workholders" thereon. A milling table is typically coupled to the milling machine by means including computer-controlled positioning devices. The table and/or spindle can be moved relative to one another very precisely along "X", "Y", and "Z" axes. Such relative movement defines a cubical area known as the "machining envelope" in which the milling machine is capable of performing various machining operations therein. As such, to maximize the machine's production, it is desirable to support as many workpieces as practical in machining orientations within the machine's machining envelope to reduce the amount of machine "downtime" encountered when replacing or reorienting workpieces within the machining envelope.

To achieve very accurate workpiece dimensions, the workpiece(s) must be supported within the machining envelope in very precise location(s) that are recognized by the computer. The workpiece(s) may be supported within the machining envelope by tool fixtures or clamps that are attached to the milling table or they may be supported in vise-like workholders such as the ones disclosed in U.S. Pat. No. 4,928,937 to Bernstein, U.S. Pat. No. 4,898,371 to Mills et al., U.S. Pat. No. 4,569,509 to Good, and U.S. Pat. No. 4,098,500 to Lenz. As can be gleaned from review of those patents, such vise-like workholders are adapted to clamp a single workpiece between opposing jaw members operably supported on a base that is adapted to be clamped or attached by other known locating and attachment methods to the milling table.

Depending upon the size(s) of the workpiece(s) to be machined, a plurality of such "single-station" vise-like workholders can be attached to the milling table or to a "grid plate" adapted to be attached to the milling table. Such workholders, however, due to their limited ability to secure numerous workpieces within the machining envelope, do not serve to maximize the use of a machine's machining envelope and, thus, fail to reduce the amount of machine downtime encountered when changing or reorienting workpieces. Moreover, such workholders typically only serve to present workpieces in a single machining orientation to the machine's spindle.

For most multiple-workpiece machining operations, vise-like workholders, that are each capable of holding two or more workpieces in side-by-side orientations, are more desirable than the workholders described above. Examples of such "two-station" workholders are disclosed in U.S. Pat. No. 5,098,073 to Lenz, U.S. Pat. No. 5,094,436 to Stephan, III, U.S. Pat. No. 5,022,636 to Swann, U.S. Pat. No. 4,934,674 to Bernstein, and U.S. Pat. No. 4,529,183 to Krason et al. Such workholders typically comprise a base that has a central jaw fixed thereto. Two outer jaws are operably supported on the base and can be selectively positioned relative to the fixed central jaw by a vise screw that is operably received in a longitudinal slot provided in the base. Again, however, those workholders do not make full use of the machine's machining envelope and, in most cases, can only present the workpieces in a single machining orientation.

In an attempt to maximize the use of the machining envelope using the above-mentioned workholding devices, a plurality of such devices are typically attached to the milling table in a side-by-side arrangement for presenting multiple workpieces to the spindle of the machining device. However, such side-by-side arrangements typically fail to maximize the use of the machining envelope in the "Z" direction even though many workholding devices may be used. Such inefficient use of the machining envelope requires the use of many relatively expensive workholding devices which, in some cases, require substantial storage space when not in use.

In an effort to address this problem, a number of modular workholding systems have been developed that, in general, comprise differently shaped support members that can support a variety of workpiece clamping members thereon that are relatively easy to store. For example, U.S. Pat. No. 4,125,251 to Jamieson, Jr. discloses a universal clamping system that comprises a collection of differently shaped clamping members that can be selectively interconnected in clamping configurations by threaded rods. Another workpiece clamping system is disclosed in U.S. Pat. No. 4,711,437 to Longenecker et al. In general, that patent discloses a column formed from interconnected grid plates each having a plurality of holes and bores in an X-Y pattern therein. Workpiece clamping members are adapted to be accurately attached to the grid plates in a variety of different workpiece supporting orientations. Yet another modular workpiece supporting system is disclosed in U.S. Pat. No. 4,968,012 to Haddad et al. Such system generally comprises a collection of removable clamping members that can be removably attached to an apertured base member by locating bushings and screws.

All of the above-mentioned systems, while providing a substantial amount of flexibility for securing a variety of differently shaped workpieces in various workholding orientations, they comprise clamping members that can be easily lost and/or damaged. Furthermore, they are incapable of selectively indexing workpieces within a machining envelope. Thus, those workholding systems cannot automatically reorient workpieces within a machining envelope to enable a plurality of different workpiece surfaces to be machined without substantially interrupting the machining process to permit the workpieces to be manually reoriented. A number of indexable workholding devices are known. However, such devices typically lack the flexibility of the modular workholding apparatuses and systems discussed above.

Thus, there is a need for a modular workholding system that includes components that can be easily stored and not easily lost or damaged. There is a further need for modular vise-like workholding components that can be attached to a support member in a variety of different workholding orientations. There is still another need for a modular workholding system that has components that can be configured to selectively indexably support at least one vise-like workholding component about an axis such that multiple surfaces of multiple workpieces can be machined without substantially interrupting the machining process to reorient the workpieces.

SUMMARY OF THE INVENTION

In accordance with a particular preferred form of the present invention, there is provided a workholding system adapted to be supported on a support member that comprises at least one clamping assembly having at least one pair of selectively movable jaws and apparatus for selectively moving the movable jaws toward and away from each other to clamp at least one workpiece therebetween. This preferred embodiment of the system further comprises at least one first base member removably attached to the support member and having a first longitudinal axis. The base member is adapted to operably support at least one clamping assembly therein in a first workholding orientation relative to the support surface such that the said pair of selectively movable jaw members thereof are selectively movable along a corresponding primary longitudinal axis that is substantially parallel to the first longitudinal axis of the first base member. At least one second base member is provided that is removably attachable to the support surface and has a second longitudinal axis. Each second base member is adapted to operably support at least one clamping assembly thereon in a second workholding orientation relative to the support surface such that said pair of selectively movable jaws thereof are selectively movable along a corresponding secondary longitudinal axis that is substantially parallel to the second longitudinal axis.

Thus, it is an object of the present invention to provide a modular vise-like workholding system that includes components that are adapted to each support at least one vise-like clamping assembly thereon in various workholding orientations.

It is a further object of the invention to provide a modular workholding system that includes interchangeable components that can be used to nonmovably support a plurality of workpieces in various fixed orientations and in other applications can be used to index a plurality of workpieces to a variety of very precise angular orientations.

It is yet another object to provide a workholding system which includes components that can be easily stored and not easily lost and/or damaged.

Accordingly, the present invention addresses the foregoing problems associated with prior workholding systems. In particular, the present invention comprises workholding components that can be used to form different workholding apparatuses that serve to further maximize the use of the machining envelope of a machining device. Thus, the present system eliminates the need for storing a number of relatively expensive "dedicated" workholders in order to support a variety of different workpieces in one or more machining orientations. In addition to those advantages, other details, objects, and advantages will become apparent as the following detailed description of the present preferred embodiments hereof proceeds.

BRIEF DESCRIPTION OF THE DRAWINGS

In the accompanying drawings, there is shown present preferred embodiments of the invention wherein like reference numerals are employed to designate like parts and wherein.

DETAILED DESCRIPTION OF PREFERRED EMBODIMENTS

Figure 1:
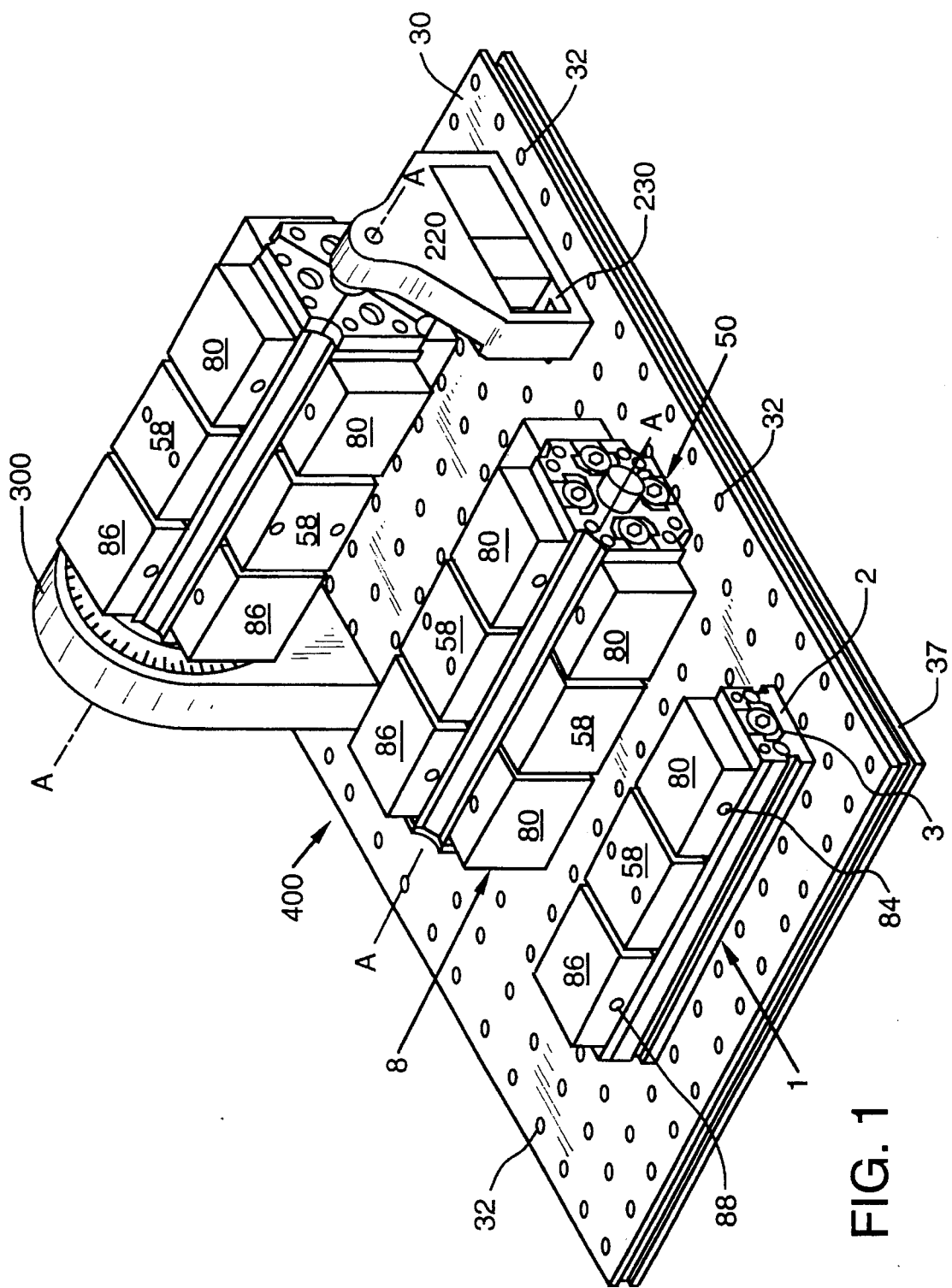
FIG. 1 is an isometric view of preferred workholding components of a modular workholding system of the present invention attached to an apertured grid plate.
Figure 3:
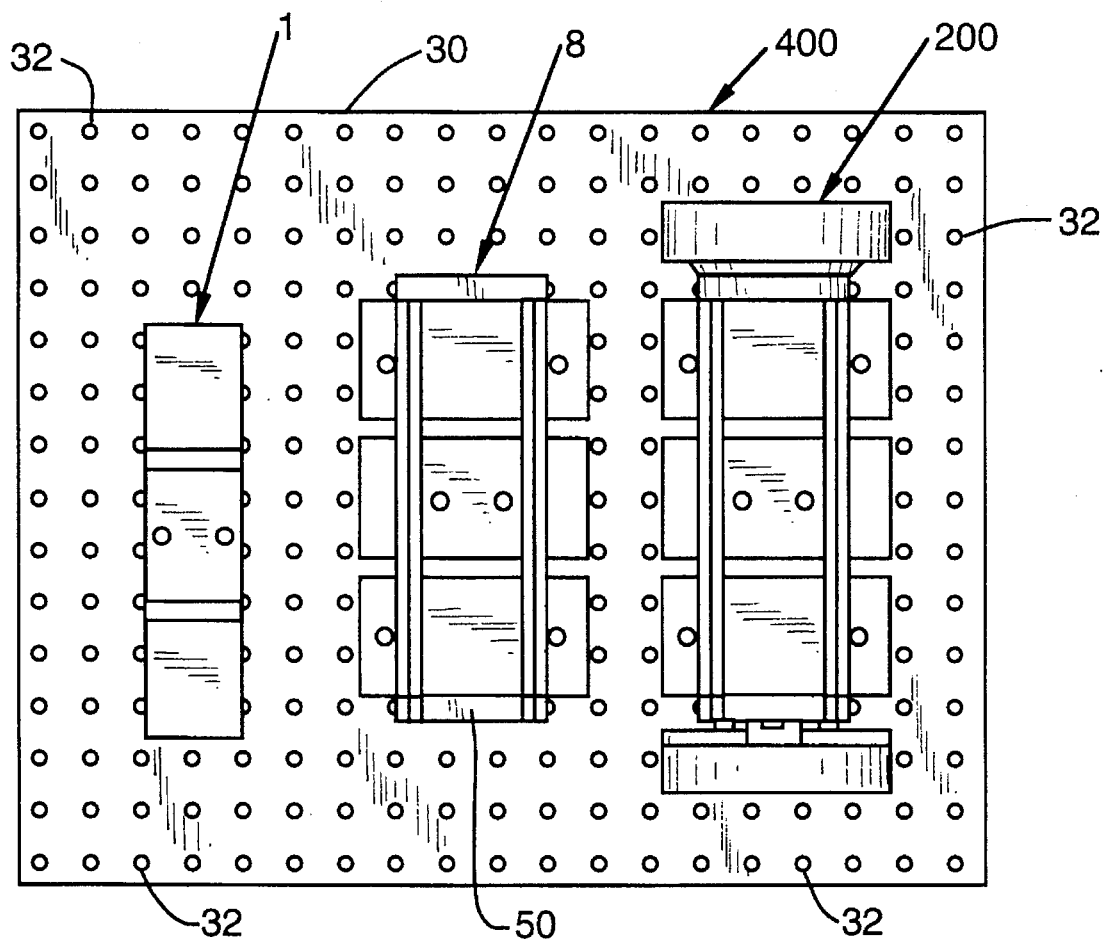
FIG. 3 is a plan view of the workholding components of the modular workholding system depicted in FIGS. 1 and 2.

Referring now to the drawings for the purposes of illustrating present preferred embodiments of the invention only and not for purposes of limiting the same, the Figures illustrate a preferred modular workholding system 400 that preferably includes an apertured grid plate 30 adapted to precisely support thereon various workholding assemblies 1, 8, and 200 that each can interchangeably support at least one vise-like clamping assembly 60 thereon. The grid plate 30 to which the assemblies (1, 8, 200) may be attached preferably has a plurality of bores 32 therein arranged in a predetermined array of orthogonally arranged rows and columns. "Tooling" or "grid" plates of this type are known in the art and, therefore, will not be discussed in great detail herein. However, in this embodiment, each bore 32 in the grid plate 30 preferably has a lower threaded portion 34 and a locating bushing 36 secured therein that is fabricated from hardened tool steel. See FIG. 6. A groove 37 is provided around the perimeter for clamping the grid plate 30 to a milling table. However, other fastening arrangements for attaching the grid plate 30 may also be used.

As can be seen in FIGS. 1–5, the system 400 includes a "single" vise-like workholding assembly 1 that is adapted to be removably attached to the grid plate 30 in precise locations. The basic structure of the workholding assembly 1 is similar to the workholding apparatus described in U.S. Pat. No. 5,022,636, issued Jun. 11, 1991, entitled "Workholding Apparatus", the disclosure of which is herein incorporated by reference. As such, in the present Detailed Description Of The Preferred Embodiments, the basic structure of the workholding assembly 1 will be described in general terms, it being understood that the particular details of the workholding assembly 1 construction, with the exception of those features which are described hereinbelow forming this embodiment of the present invention, may be gleaned from a review of that patent.

The vise-like workholding assembly 1 generally comprises a base member 2 which is an elongated metallic structure typically fabricated from a high strength aluminum material. A cavity 3 is machined along the longitudinal axis of the base member 2 and defines a slot 4 having two longitudinally extending side rail members 5. In addition, a clamping assembly, generally designated as 60 is provided for movement within the cavity 3 and slot 4. The clamping assemblies 60 are preferably of the type disclosed in U.S. Pat. No. 5,024,427, the disclosure of which is herein incorporated by reference.

In general, a clamping assembly 60 preferably comprises a first movable support member 62 and a second movable support member 68 which are each adapted to be received within the cavity 3 in the base 2. See FIGS. 4 and 5. The clamping assembly 60 also preferably includes a screw shaft 74 that is sized to be received within a corresponding slot 56 in the column member 50. The screw shaft 74 preferably has threads 76 which are intended to engage a threaded bore 63 within the first movable support member 62. In addition, the screw shaft 74 includes means (not shown) for engaging and displacing the second movable support member 68 thereon. The screw shaft 74 passes through the second movable support member 68 while the other end of the screw shaft 74 is configured to receive an allen wrench or other apparatus for selectively supplying rotary motion to the screw shaft 74.

Figure 4:
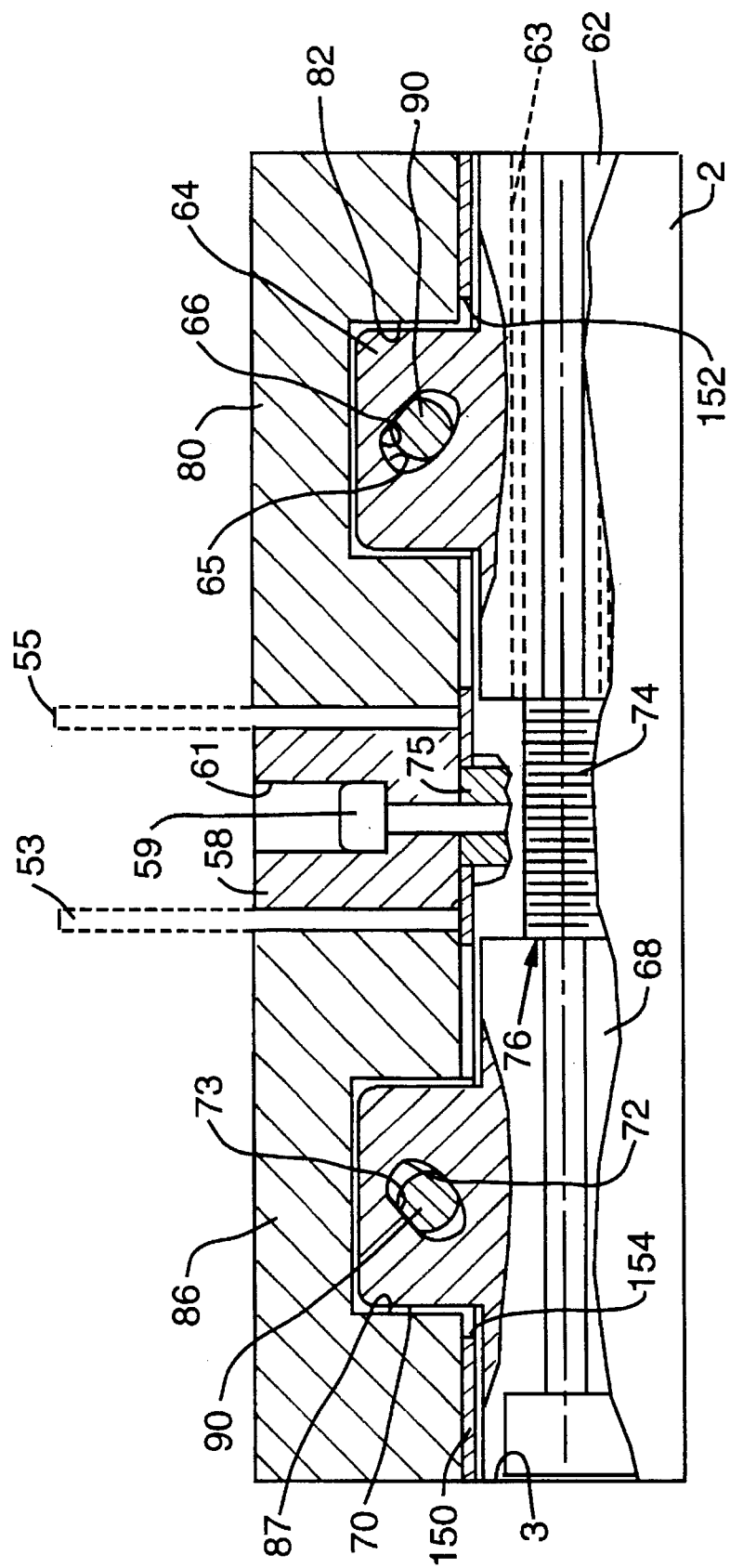
FIG. 4 is a side elevational view of a preferred single vise-like workholder of the present invention with some of the elements thereof shown in cross-section for clarity.

A "first" center jaw 58 is preferably attached to the base 2 intermediate the base ends in a predetermined position as shown in FIGS. 1 and 4. In a preferred embodiment, each center jaw 58 is removably attached to the base 2 by cap screws 59 that extend through corresponding bores 61 in the center jaw member 58. Preferably, locating bushings 75 are pressed into corresponding bores 75' in the base 2 and are coaxially arranged with threaded bores 75". See FIG. 5. One locating bushing 75 preferably has a round aperture 77' therethrough and the other locating bushing 75 preferably has an elongated slot 77" therethrough. The bushings 75 are adapted to receive therein the shoulder portions of corresponding capscrews 59 to precisely locate the center jaw 58 on the base 2. Other locating pin arrangements that are known in the art may also be used to precisely locate each center jaw member 58 on the base 2. For example, the locating arrangement such as the one disclosed in a co-pending U.S. patent application entitled "Apparatus For Positioning An Object On A Surface", Ser. No. 08/300,375 filed Sep. 2, 1994, that is owned by the owner of the present application, the disclosure of which is herein incorporated by reference, may also be used in those instances wherein it is desirable to have each center jaw 58 precisely located on and attached to the base 2.

As shown in FIG. 4, a "first" jaw member 80 corresponds with each first movable support member 62 and is preferably removably attached thereto. Similarly, a second jaw member 86 corresponds with each second movable support member 68 and is removably attached thereto. The jaw members (80, 86) are preferably similar to those workholding jaw portions disclosed in U.S. Pat. No. 5,024,427 entitled "Quick Change Head For Precision Machine Vise" the disclosure of which is also herein incorporated by reference. As such, in the present "Detailed Description Of Preferred Embodiments", the basic jaw structure of each clamping assembly 60 will be described in general terms, it being understood that the particular details of the jaw member construction, with the exception of those features which are described hereinbelow forming these embodiments of the present invention, may be gleaned from a review of that patent.

In general, as can also be seen in FIG. 4, each first movable support member 62 has a "first" extended portion 64 that extends above the base 2. The first extended portion 64 has a "first" transverse bore 65 extending therethrough that has a "first" flat surface 66 machined therein. Similarly, each second movable support member 68 has a "second" extended portion 70 that extends above the base 2. The second extended portion 70 has a "second" transverse bore 72 that extends therethrough that has a "second" flat surface 73 machined thereon. In addition, each first jaw member 80 preferably has a "first" cavity 82 therein that is sized to receive a "first" extended portion 64 of a corresponding first movable support member 62. A "primary" transverse bore 84 is preferably provided through the first jaw member 80 such that the primary transverse bore 84 will be substantially coaxially aligned with the first transverse bore 65 when the first extended portion 64 is received within the first cavity 82 in the first jaw 80. See FIGS. 1 and 4. Also, the second jaw member 86 preferably has a "second" cavity 87 therein that is sized to receive a second extended portion 70 of a corresponding second movable support member 68. In addition, a "secondary" transverse bore 88 is preferably provided through the second jaw member 86 such that the secondary transverse bore 88 will be substantially coaxially aligned with the second transverse bore 72 when the second extended portion 70 is received within the second cavity 87 in the second jaw member 86.

The first jaw member 80 is preferably removably attached to the first movable support member 62 and the second jaw member 86 is preferably removably attached to the second movable support member by removable pins 90. The preferred construction of pins 90 is set forth in detail in U.S. Pat. No. 5,024,427, the disclosure of which was incorporated by reference hereinabove. In general terms, however, each pin 90 has a planar portion 92 which is adapted to be brought into contact with the flat surfaces (66, 73) in bores (65, 72). In particular, the first jaw 80 is preferably removably attached to the first movable support member 62 by inserting a corresponding pin 90 through the coaxially aligned bores 84 and 65 such that the planar portion 92 of the pin 90 engages the first flat surface 66 of the first transverse bore 65. Similarly, the second jaw 86 is preferably removably attached to the second movable support member 68 by inserting a corresponding pin 90 through the coaxially aligned bores 88 and 72 such that the planar portion 92 of the pin 90 engages the second flat surface 73 of the second transverse bore 72.

As can be seen in FIG. 4, the center jaw 58 is arranged on the base 2 such that the first and second movable support members (62, 68) may move toward and away from the center jaw 58 to cause, for example, workpieces 53 and 55 to be clamped between the center jaw 58 and first and second jaws (80, 86). For example, when the screw shaft 74 is rotated, the first movable support member 62 is moved relative to the center jaw 58, thereby causing the first jaw 80 to move toward the center jaw 58 to clamp a first workpiece 53 therebetween. In addition, the rotation of the screw shaft 74 and its movement relative to the first movable support member 62 causes the secondary movable support member 68 to move toward the center jaw 58 to cause the second jaw member 86 to engage and restrain a second workpiece 55 between the second jaw member 86 and the center jaw 58.

Figure 5:
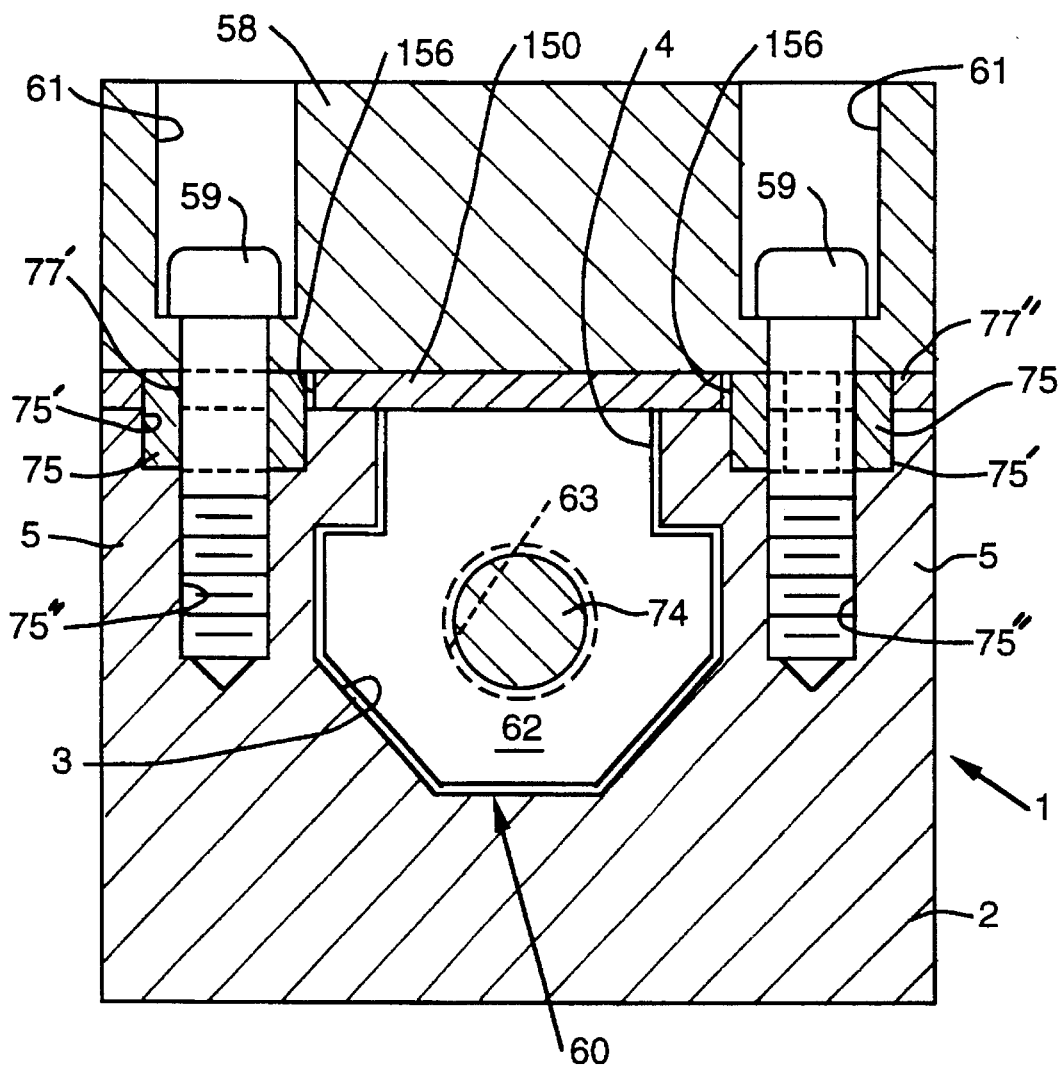
FIG. 5 is a cross-sectional end elevational view of the workholder of FIG. 4.

Also, a debris shield 150, is preferably positioned between base and the first and second jaw members (80, 86) to prevent chips and debris from entering the longitudinal cavity 3. Preferably, the debris shield 150 has a first opening 152 therein adapted to receive the first extended portion 64 of the first movable support member 62 and a second opening 154 therein adapted to receive the second extended portion 70 of the first movable support member 68. In addition, debris shield 150 has bores 156 adapted to receive bushings 75 therein. Debris shield 150 is preferably fabricated out of tool steel having a Rockwell hardness of approximately 50 (C scale). It will be appreciated that when the debris shield 150 is received on the base 2 as shown in FIGS. 4 and 5, the clamping assembly 60 is operably longitudinally retained within the cavity 3 by virtue of the debris shield's engagement with the bushings 75 in combination with the length of the openings in the shield. It will be appreciated that openings (152, 154) are sized relative to the first and second jaw members (80, 86) such that regardless of where the first and second jaw members (80, 86) are located, the openings (152, 154) are always covered to prevent debris from entering the longitudinal cavity 3.

As can also be seen in FIG. 1, another component of the present modular workholding system 400 comprises a workholding assembly 8 that can be attached to the grid plate 30 in a precise position for supporting a workholder supporting column 50 thereon. The column 50 depicted in the present Figures comprises an elongated metallic structure typically fabricated from a high strength aluminum material having four longitudinal surfaces 52 thereon. The skilled artisan will readily appreciate, however, the adaptor member 10 of the present invention can be used to support columns of various other shapes and constructions without departing from the spirit and scope of the present invention.

Figure 2:
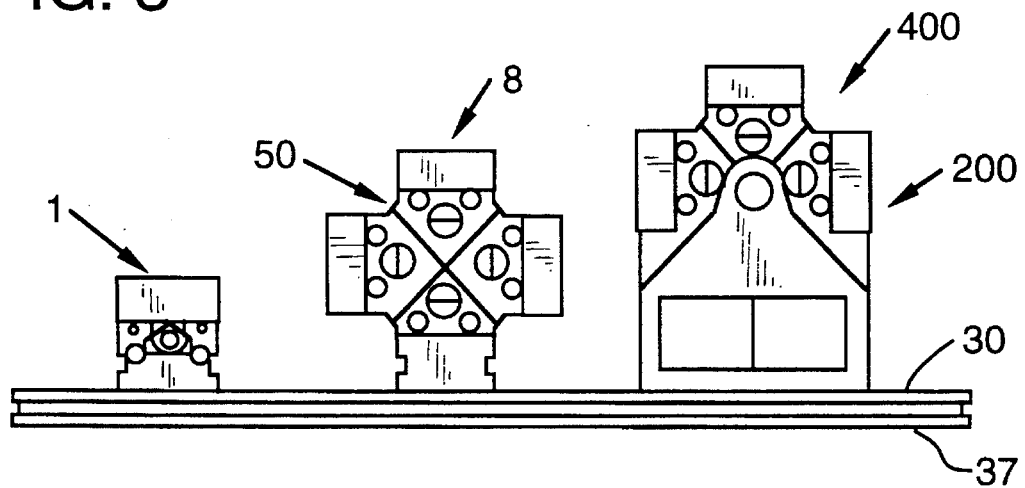
FIG. 2 is an end elevational view of the workholding components of the modular workholding system depicted in FIG. 1.

As can be seen in FIGS. 1 and 2, the column 50 has a longitudinal axis "A—A". A longitudinally extending cavity 54 having a longitudinal axis "B—B" is preferably provided in each surface 52 of the column 50 such that each axis "B—B" is substantially parallel to axis "A—A". Each longitudinal cavity 54 defines a corresponding slot 56 having two longitudinally extending side rail members 57. In addition, a corresponding clamping assembly 60, a preferred construction of which was discussed in detail above is provided for longitudinal movement within each cavity 54.

Figure 6:
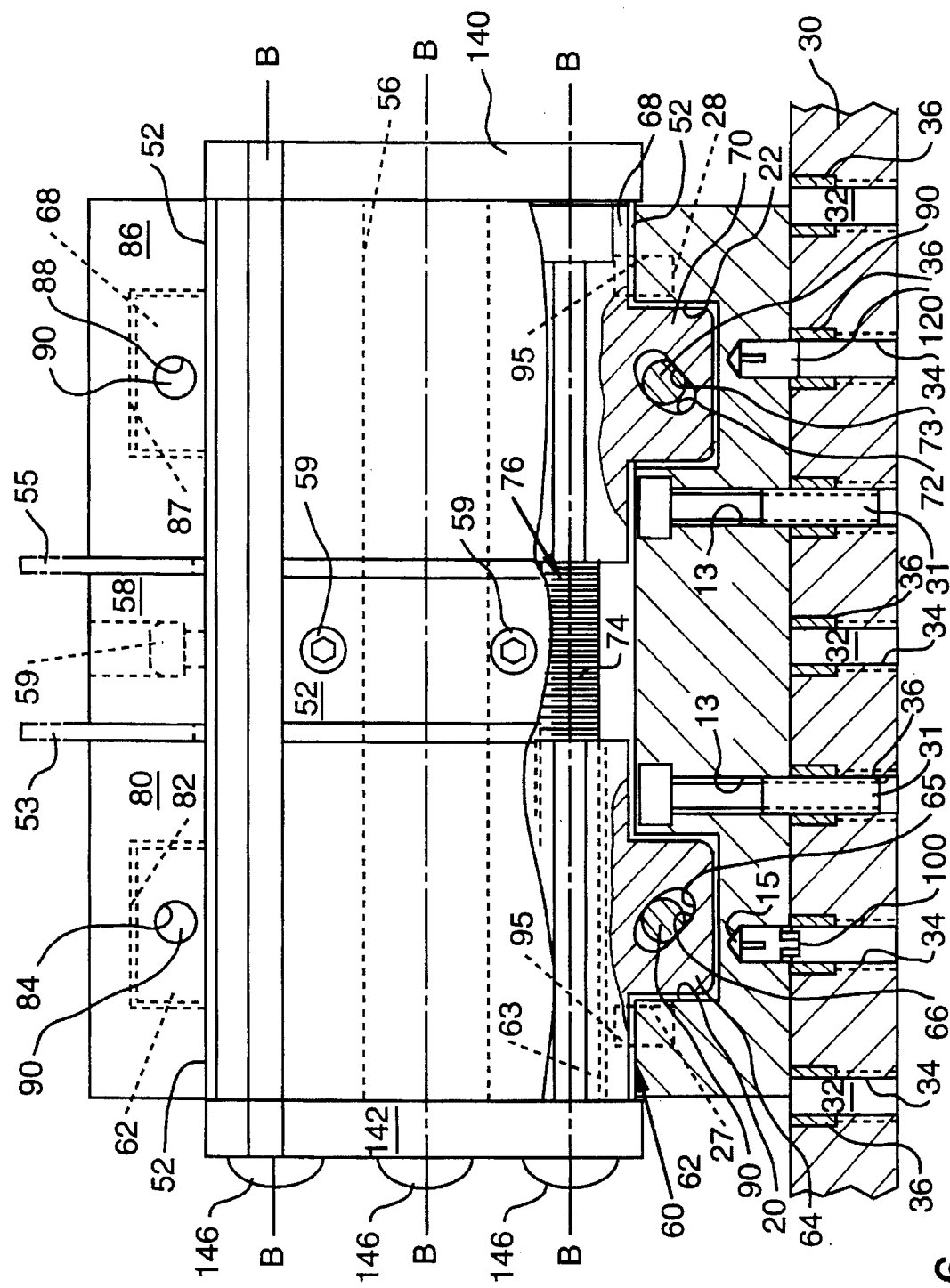
FIG. 6 is side elevational view of a preferred column member supported on a preferred adaptor member with some elements shown in cross-section for clarity.

A "first" center jaw 58 corresponds with each surface 52 and is preferably attached thereto intermediate the column ends in a predetermined position as shown in FIGS. 1 and 6. In a preferred embodiment, each center jaw 58 is removably attached to its corresponding surface 52 by cap screws 59. Locating pin arrangements that are known in the art may be used to precisely locate each center jaw member 58 on a corresponding surface 52 of the column 50 in a precise location. Other locating arrangements, such as the one disclosed in a co-pending U.S. patent application entitled "Apparatus For Positioning An Element On A Surface", Ser. No. 08/300,375, filed Sep. 2, 1994, and owned by the owner of the present application, the disclosure of which was herein incorporated by reference, may also be used in those instances wherein each center jaw 58 must be attached to the column 50 in very precise predetermined positions.

As shown in FIG. 6, a "first" jaw member 80 corresponds with each first movable support member 62 and is preferably removably attached thereto in the manner discussed above. Similarly, a second jaw member 86 corresponds with each second movable support member 68 and is removably attached thereto in the manner discussed above. As can be seen in FIG. 6, each center jaw 58 is arranged on a corresponding surface 52 of the column 50 such that the corresponding first and second movable support members (62, 68) may move toward and away from the corresponding center jaw member 58 to cause, for example, workpieces 53 and 55 to be clamped between the center jaw 58 and first and second jaws (80, 86). For example, when the screw shaft 74 is rotated, the first movable support member 62 is moved relative to the center jaw 58, thereby causing the first jaw 80 to move toward the center jaw 58 to clamp a first workpiece 53 therebetween. In addition, the rotation of the screw shaft 74 and its movement relative to the first movable support member 62 causes the second movable support member 68 to move toward the center jaw 58 to cause the second jaw member 86 to engage and restrain a second workpiece 55 between the second jaw member 86 and the center jaw 58.

While it will be apparent to the skilled artisan that the first and second jaw members (80, 86) can be removably attached to their corresponding first and second movable support members (62, 68), respectively, by a variety of other known fastening arrangements, one unique advantage of the jaw fastening method described above is the ability to attach the column 50 to the adaptor member 10 utilizing the same pins 90 that are used to attach the first and second jaw members (80, 86). The reader will obtain a greater appreciation of this advantage from the detailed description that follows.

Figure 8:
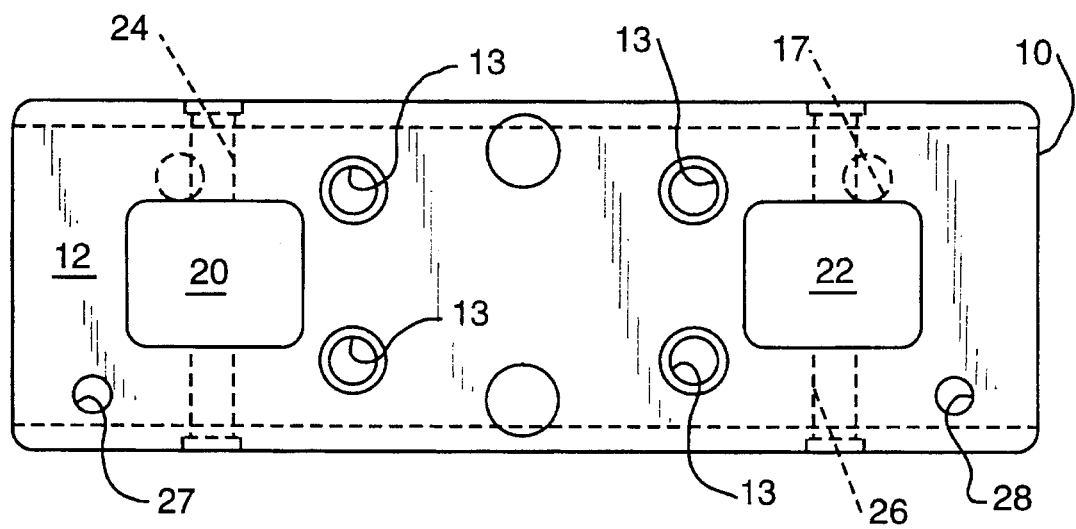
FIG. 8 is a plan view of a preferred adaptor member of the present invention.
Figure 9:
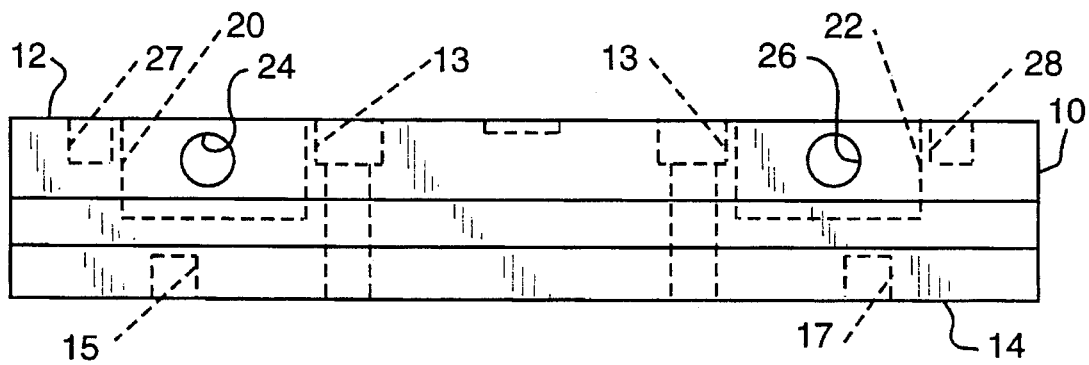
FIG. 9 is a side elevational view of the adaptor member of FIG. 8.
Figure 10:
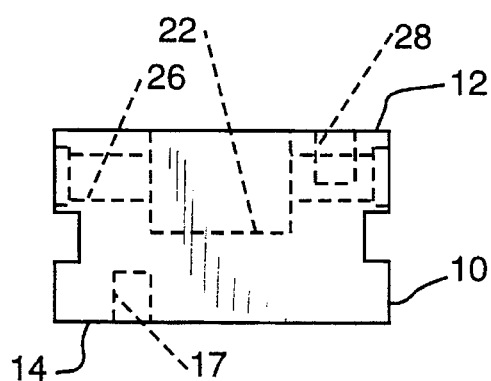
FIG. 10 is an end view of the adaptor member depicted in FIGS. 8 and 9.
Figure 11:
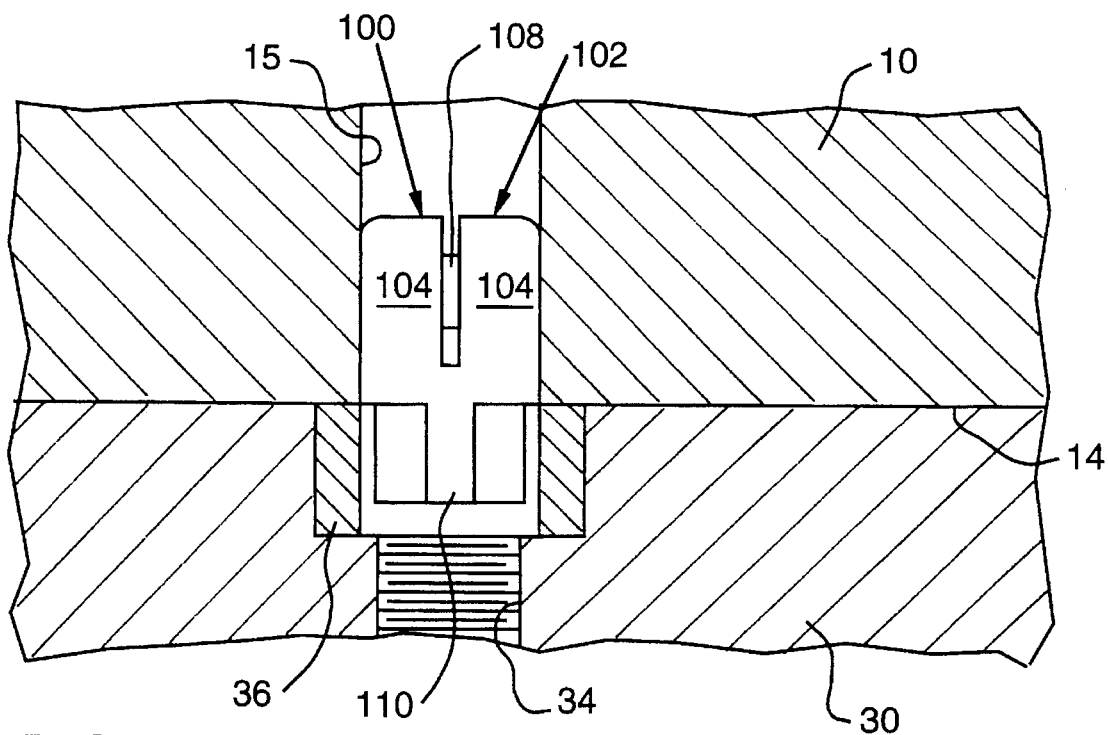
FIG. 11 is a partial cross-sectional assembly view of a column received on a preferred adaptor member of the present invention showing a preferred removable locating pin received in a corresponding bore in the adaptor member.

More specifically and with reference to FIGS. 8–10, the adaptor member 10, in a preferred form, comprises an elongated plate member fabricated from high strength aluminum material. The skilled artisan will appreciate, however, that the adaptor member 10 may be provided in other configurations so long as they function in accordance with this invention and may be fabricated from a variety of other suitable materials. Preferably, the adaptor member 10 has a planar receiving surface 12 adapted to receive and support thereon one of the surfaces 52 of the column 50. The adaptor member 10 also has an attachment surface 14 that is adapted to be received on the surface of the grid plate 30.

The adaptor member 10 is preferably provided with a first removably attachable locating pin 100 that is shown in FIGS. 11–14. As can be seen in those Figures, locating pin 100 is preferably of the type manufactured by Chick Machine Tool, Inc. under Part No. PIN12D and, in general, has an expandable upper portion 102 sized to be received in an attachment bore 15 provided in the attachment surface 14 of the adaptor member 10. Locating pin 100 also has a "diamond" shaped lower portion 110 adapted to be received in any one of the locating bushings 36 of support plate 30. See FIG. 11. The lower portion 110 has a threaded bore 112 extending therethrough that is adapted to receive a threaded set screw 114 assembly therein. The upper portion 102 preferably comprises four arcuate segments 104 that define an axial passage 106 therebetween that is substantially coaxially aligned with the threaded bore 112 in the lower portion 110.

Figures 12, 13, 14:
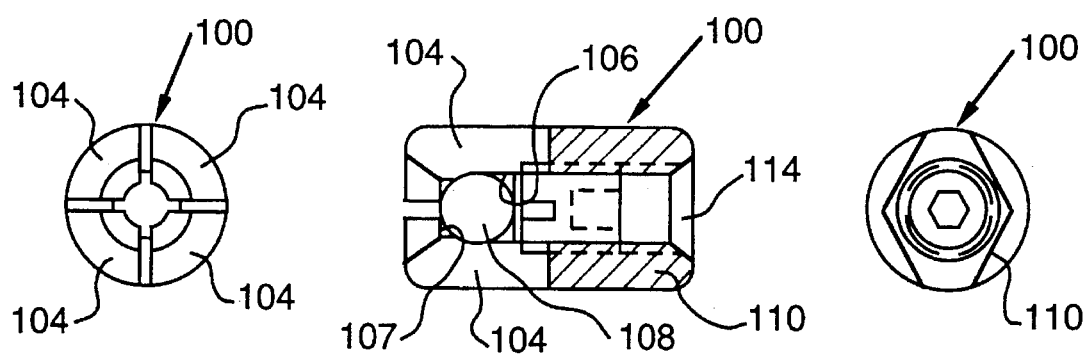
FIG. 12 is a longitudinal cross-sectional view of the removable locating pin of FIG. 11, with some of the elements thereof shown in full view for clarity.
FIG. 13 is an end view of the removable locating pin of FIGS. 11 and 12.
FIG. 14 is a view of the opposite end of the removable locating pin of FIG. 13.
Figure 15:
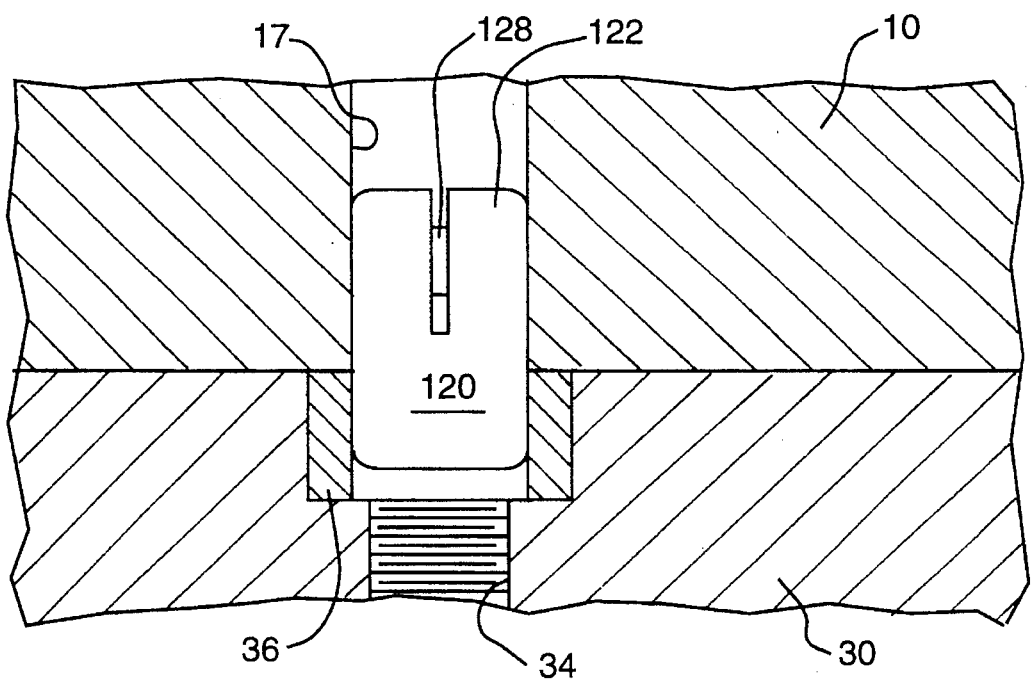
FIG. 15 is a partial cross-sectional assembly view of a column received on a preferred adaptor member of the present invention showing another preferred removable locating pin received in a corresponding bore in the adaptor member.
Figure 18:
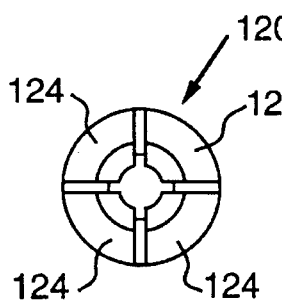
FIG. 18 is view of the opposite end of the removable locating pin of FIG. 17.

As can be seen in FIG. 12, axial passage 106 has a smaller diameter 107 at the outer end thereof and houses a movable ball bearing 108 therein. Thus to removably attach the locating pin 100 to the adaptor member 10, the expandable upper portion 102 is inserted into a bore 15 in the attachment surface 14 of the adaptor member 10 and set screw assembly 114 is advanced into contact with ball bearing 108. As ball bearing 108 is forced into the outer portion 107 of axial passage 106, the four arcuate segments 104 are forced outwardly to engage the inner surface of bore 15 to retain the pin 100 therein.

Similarly, locating pin 120 has an expandable upper portion 122 sized to be received in an attachment bore 17 provided in the attachment surface 14 of the adaptor member 10. See FIGS. 15–18. Locating pin 120 also has a lower portion 130 that preferably has a circular cross-sectional shape adapted to be received in any one of the locating bushings 36 of support plate 30. The lower portion 130 has a threaded bore 132 extending therethrough that is adapted to receive a threaded set screw 134 assembly therein. The upper portion 122 preferably comprises four arcuate segments 124 that define an axial passage 126 therebetween that is substantially coaxially aligned with the threaded bore 132 in the lower portion 130.

Figure 16:
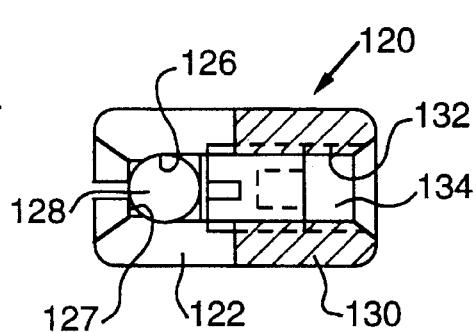
FIG. 16 is a longitudinal cross-sectional view of the removable locating pin of FIG. 15, with some of the elements thereof shown in full view for clarity.
Figure 17:
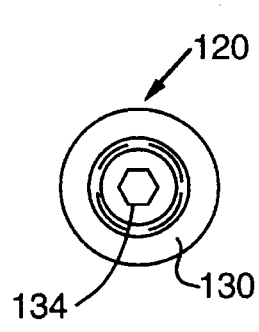
FIG. 17 is an end view of the removable locating pin of FIGS. 15 and 16.

As can be seen in FIG. 16 axial passage 126 has a smaller diameter 127 at the outer end thereof and houses a movable ball bearing 128 therein. Thus, to removably attach the locating pin 120 to the adaptor member 10, the expandable upper portion 122 is inserted into a bore 17 in the attachment surface 14 of the adaptor member 10 and set screw assembly 134 is advanced into contact with ball bearing 128. As ball bearing 128 is forced into the outer portion 127 of axial passage 126, the four arcuate segments 124 are forced outwardly to engage the inner surface of bore 17 to retain the pin 120 therein. It will be appreciated that pins 100 and 120 extend from the bottom surface of the adaptor member 10 and are capable of being inserted into any of two corresponding bushings 36 in the support plate 30 to precisely locate the adaptor member 10 on the support plate 30. It will be further appreciated that when the locating pins (100, 120) engage locating bushings 36 in corresponding bores 32 on plate 30, the adaptor member 10 of the present invention will be precisely located on the support plate 30 in a predetermined position.

In this embodiment, the adaptor member 10 is attached to the grid plate 30 by cap screws 31 that extend through through bores 13 in the base to threadedly engage the threaded portion 34 of corresponding bores 32. See FIG. 6. The skilled artisan will appreciate that the adaptor member 10 can be attached to a grid plate or other member in precise relationship to one another by a myriad of other known locating and fastening methods and apparatus without departing from the spirit and scope of the present invention. For example, the apparatus disclosed in the copending U.S. patent application entitled "Apparatus for Positioning An Element On A Surface", Ser. No. 08/300,375, that was mentioned above and herein incorporated by reference may also be successfully used to attach the adaptor 10 of the present invention to a grid plate 30 in predetermined orientations.

In a preferred embodiment, the receiving surface of the adaptor member 10 has a "first" receiving cavity 20 therein that is sized to receive a first extended portion 64 of a corresponding first movable support member 62 and a "second" receiving cavity 22 that is sized to receive a second extended portion 70 of a corresponding second movable support member 68 of a clamping assembly 60. As can be seen in FIG. 8, a "primary" transverse bore 24 is provided in the adaptor member 10 such that it extends on both sides of the first receiving cavity 20. Similarly, a "secondary" transverse bore 26 is provided through the adaptor 10 such that it extends on both sides of the second receiving cavity 22. Also, to align one of the column surfaces 52 in a predetermined confronting relationship on the receiving surface 14 of the adaptor member 10, bores 27 and 28 are preferably provided in the receiving surface 14 of the adaptor member 10 for receiving corresponding locating pins (100, 120) of the type and construction described hereinabove that are removably attached to a surface 52 of the column 50. See FIGS. 6 and 8.

Preferably, every surface 50 of the column 52 has two pin locating bores 95 therein for selectively receiving removable pins (100, 120) therein. See FIG. 6. During machining operations, it will be appreciated that bores 95 are so located in the surfaces 52 of the column 50 such that they are always covered by the first and second jaws (80, 86), respectively, to prevent chips and other machining debris from entering therein.

Thus, to attach the column 50 to the adaptor 10, in a precise predetermined orientation, a center jaw 58 is removed from one of the column surfaces 52. In addition, the corresponding first and second jaw members (80, 86) are detached from their corresponding first and second movable support members (62, 68) by removing the corresponding pins 90 to thereby expose the first and second extended portions (64, 70). Also to facilitate precise alignment of the column 50 on the adaptor member 10, a locating pin 100 is inserted and attached, in the above-described manner, to one of the bores 95 in the surface 52 of column 50. Likewise, a locating pin 120 is inserted in and attached to the other bore 95 in that surface. Thereafter, the now exposed surface 52 is brought into confronting relationship with the receiving surface 12 such that the locating portions (102, 122) of the pins (100, 120), respectively, are received in corresponding bores 95 and the exposed first extended portion 64 is received in the first receiving cavity 20 and the exposed second extended portion 70 is received within the second receiving cavity 22. The corresponding screw shaft 74 may be rotated, if necessary, to align the first transverse bore 65 in the first extended portion 64 of the first movable support member 60 with the primary transverse bore 24 in the adaptor member 10 and also align the second transverse bore 72 in the second extended portion 70 with the secondary transverse bore 26 in the adaptor member 10. After the first transverse bore 65 is aligned with the primary transverse bore 24 and the second transverse bore 72 is aligned with the secondary transverse bore 26, the pins 90 that formerly attached the first and second jaw members (80, 86) to the first and second extended portions (64, 70), respectively, are inserted into aligned bores (65, 24) and (72, 26) to removably couple the column 50 to the adaptor member 10. When it thereafter becomes desirable to use the workholder column 50 in a different orientation and the present adaptor member 10 is no longer needed, the pins 90 that are coupling the column 50 to the adaptor member 10 are removed to enable the column 50 to be detached from the adaptor member 10. Thereafter the pins (100, 120) that are inserted into bore 95 in the surface 52 of the column 50 are also removed and the corresponding first and second jaw members (80, 86) are reattached in the manner described above.

Figure 7:
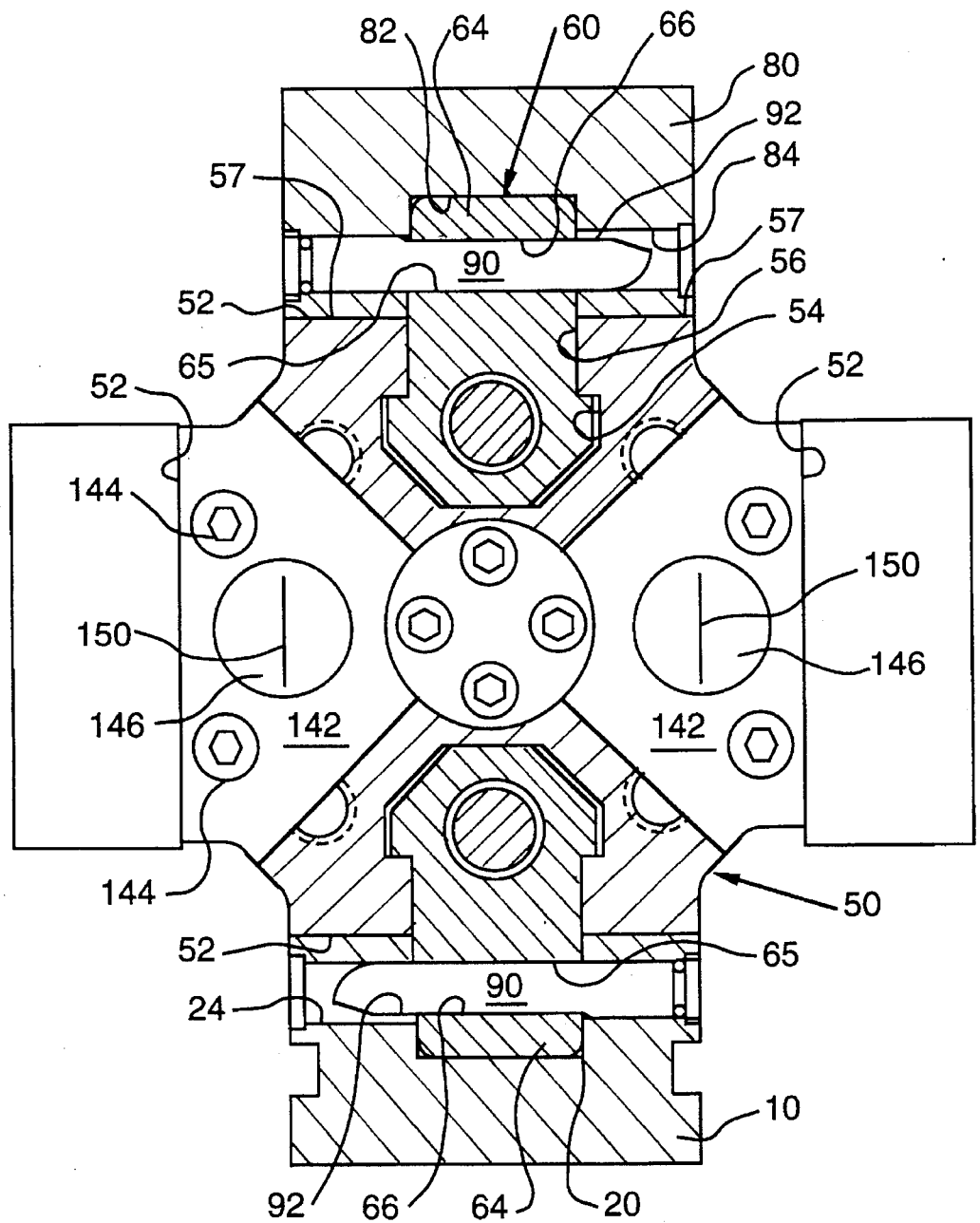
FIG. 7 is an end elevational view of the column and endplate assembly of FIG. 6, showing some elements in cross-section for clarity.

Also in a preferred embodiment a plurality of endplate segments 142 are attached to the front end 51 of the column by capscrews 144 in the manner depicted in FIGS. 1 and 7. Each end plate segment 142, preferably has an axial bore therethrough (not shown) that provides operational access to the end of the corresponding screw shaft 74. To prevent chips and debris from accumulating in those axial bores, a resilient cover 146 is preferably pressed into each axial bore. Each resilient cover 146 also has an access slit 150 through which an allen wrench or other suitable tool may be inserted. See FIG. 7. After the wrench has been removed, the slit 150 automatically closes to thereby prevent debris or chip infiltration therein. Also, as will be discussed in further detail below, the column 50 has an axial bore 242 therethrough. Thus, to prevent chips and debris from accumulating in that axial bore when the column 50 is used in this position, an endcap 140 is attached by capscrews (not shown) to the opposite end 51' of the column 50. An endcap 148 is also preferably attached to the forward end of the column 50 by capscrews 149. See FIG. 7.

Figures 19, 20, 21:
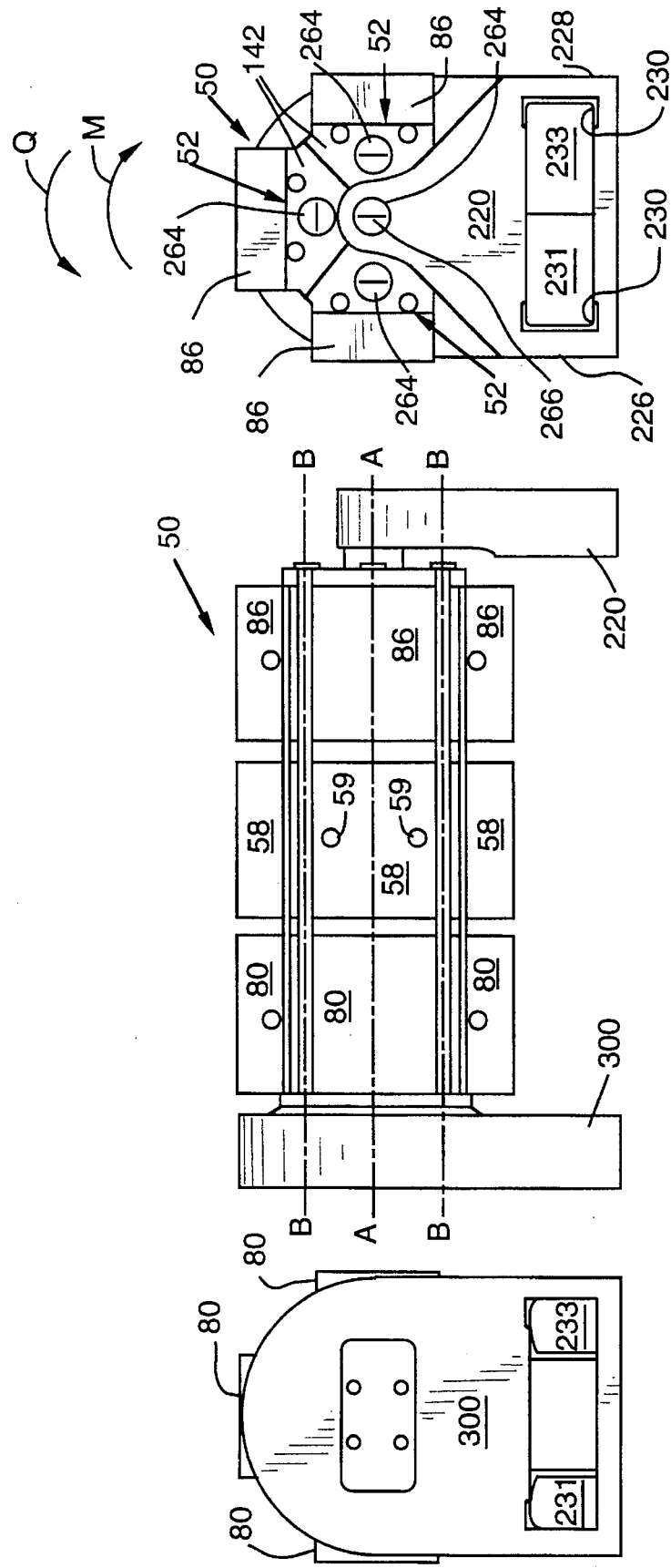
FIG. 19 is a side elevational view of a preferred indexable workholding assembly of the present invention.
FIG. 20 is an end elevational view of the front end of the indexable workholding assembly of FIG. 19.
FIG. 21 is an end elevational view of the opposite end of the indexable workholding assembly of FIGS. 19 and 20.
Figure 22:
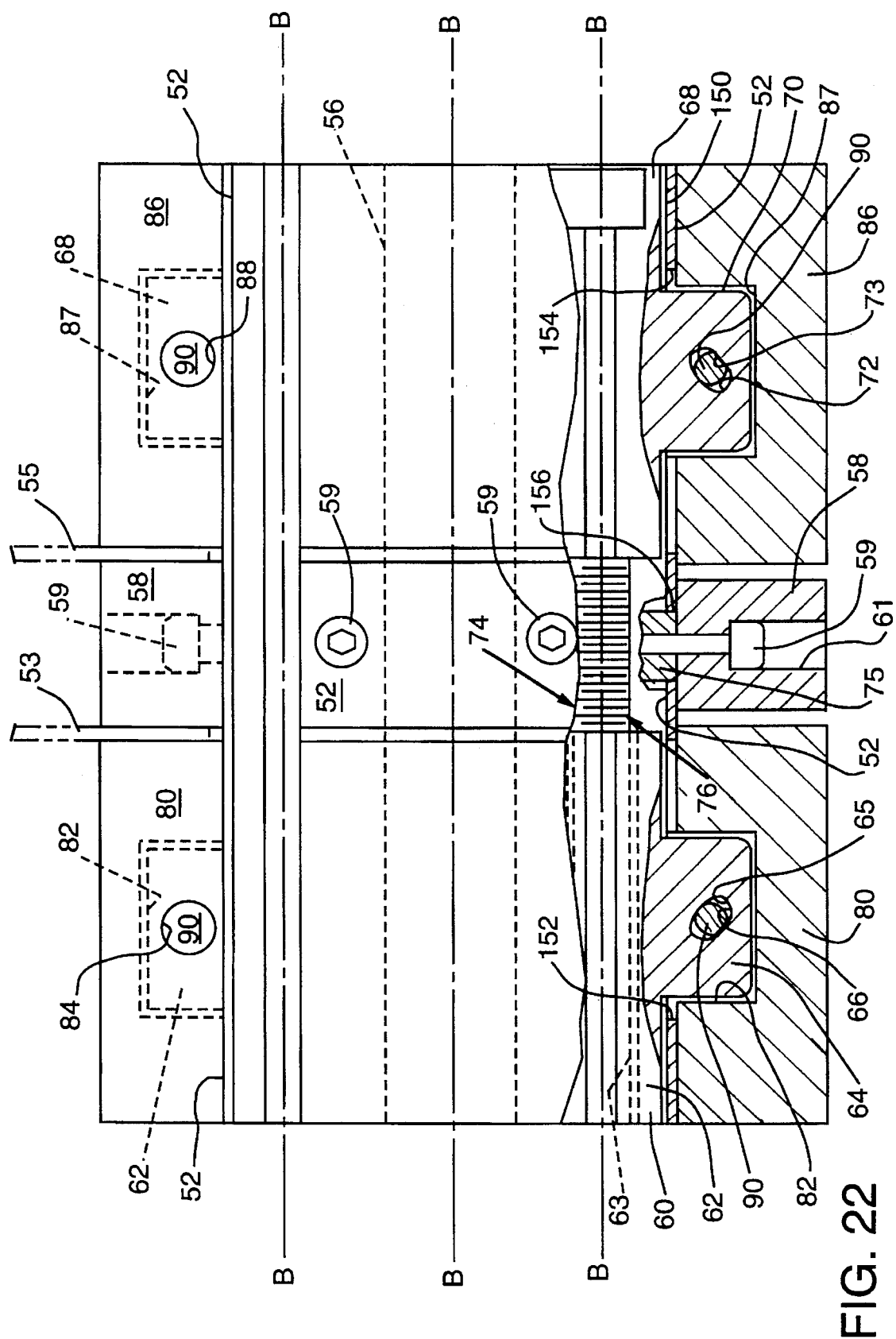
FIG. 22 is a partial cross-sectional side elevational view of a column member of an indexable workholding assembly, with some of the elements thereof shown in full view for clarity.
Figure 23:
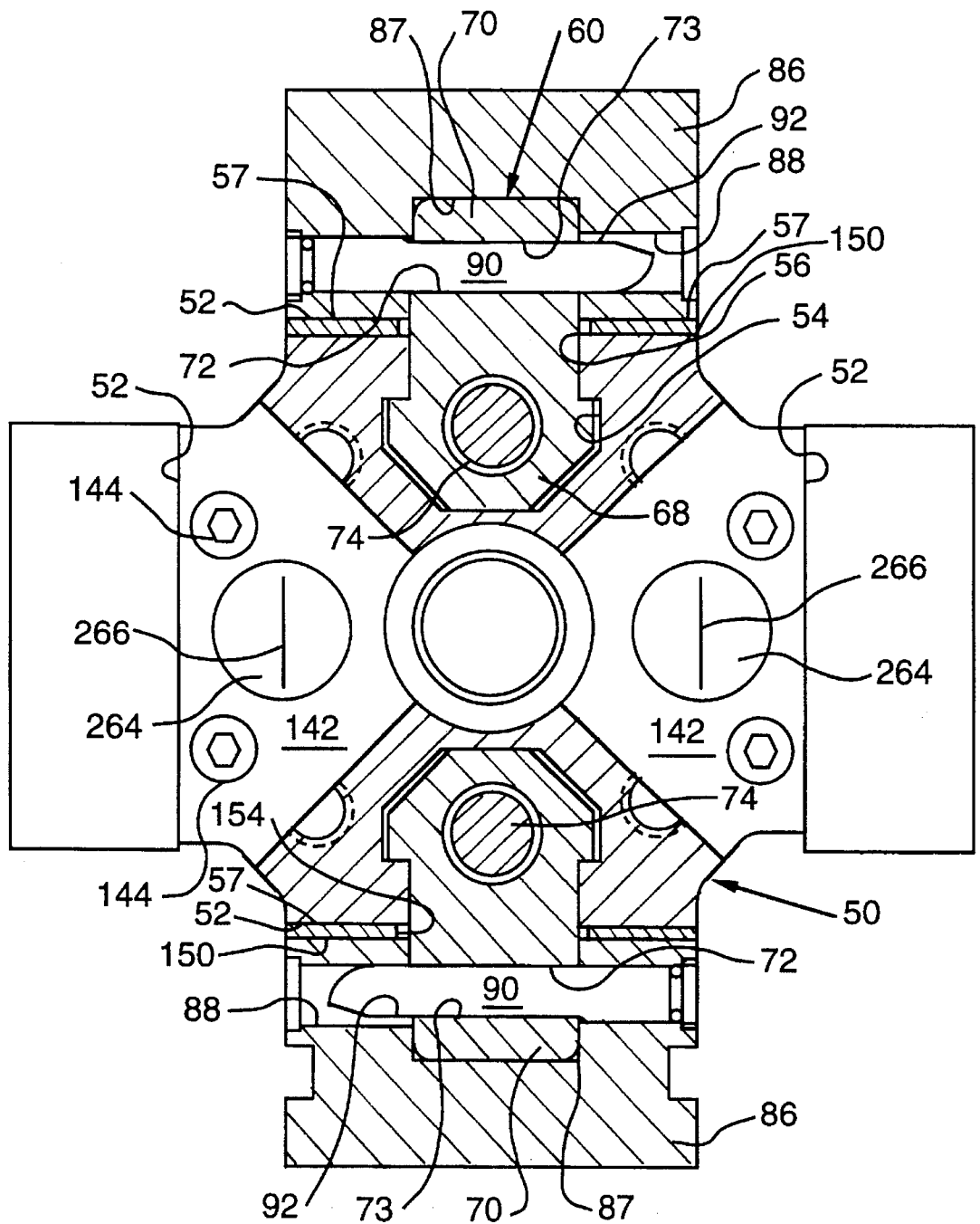
FIG. 23 is an end elevational view of the column of FIG. 22 with some of the elements thereof shown in cross-section for clarity.

In those applications where it is desirable to have an indexable workholding system, the column member 50 can be used in connection with an indexable support apparatus, collectively designated as 210, that comprises, among other things, a "first" upstanding support member 220 and a "second" upstanding support member 300. See FIG. 1. The first support member 220 is preferably fabricated from aluminum in the shape shown in FIGS. 1 and 20. However, the reader will appreciate that the first support member 220 can be fabricated from other suitable materials in various other shapes. Preferably, the first support member 220 has a lower support plate 222 attached thereto that is designed to support the first support member 220 on the grid plate 30. As can be seen in FIG. 20, the opposing lower ends (226, 228) of the first support member 220 are each preferably provided with a fastener cavity 230. Each fastener cavity 230 has a fastener bore 232 therein that is coaxially aligned with a corresponding very accurately sized bore 232' in the support plate 222. See FIG. 24. Preferably, a locating screw 234 having a very accurately ground locating shoulder is inserted through the fastener bores (232, 232') to be threadedly received in corresponding threaded bores 34 in the grid plate 30. It will be appreciated that the shoulder portion of the screw 234, in cooperation with the bushing 36, serves to accurately locate the first support member 220 on the grid plate 30. Such locating and fastening method advantageously permits the workholding assembly 200 to be slidably positioned on the grid plate 30 during the initial orientation thereof. Furthermore, those of ordinary skill in the art will appreciate that by locating the locating screws 234 inside of the first support member 220, the fasteners and the support member are less susceptible to damage than other prior designs. This method of locating and attaching the first support member 220 to the grid plate 30 is also preferably used to attach the second support member 300 to the grid plate 30. The skilled artisan will further appreciate, however, that the first and second support members (220, 300) can be attached to a grid plate or other member in precise relationship to one another by a myriad of other known locating and fastening methods and apparatus without departing from the spirit and scope of the present invention. For example, the apparatus disclosed in the copending U.S. patent application entitled "Apparatus for Positioning An Element On A Surface", Ser. No. 08/300, 375, that was mentioned above and herein incorporated by reference may also be successfully used to attach the adaptor 10 of the present invention to a support plate 30 in predetermined orientations.

To prevent chips and debris from entering fastener cavities 230, while providing a means for accessing the capscrews 234, slidable chip covers (231, 233) are slidably and overlappingly received in corresponding receiving slots (223, 225). To gain access to the capscrews 234, the chip covers (231, 233) are simply slidably displaced within the grooves (223, 225).

Figure 24:
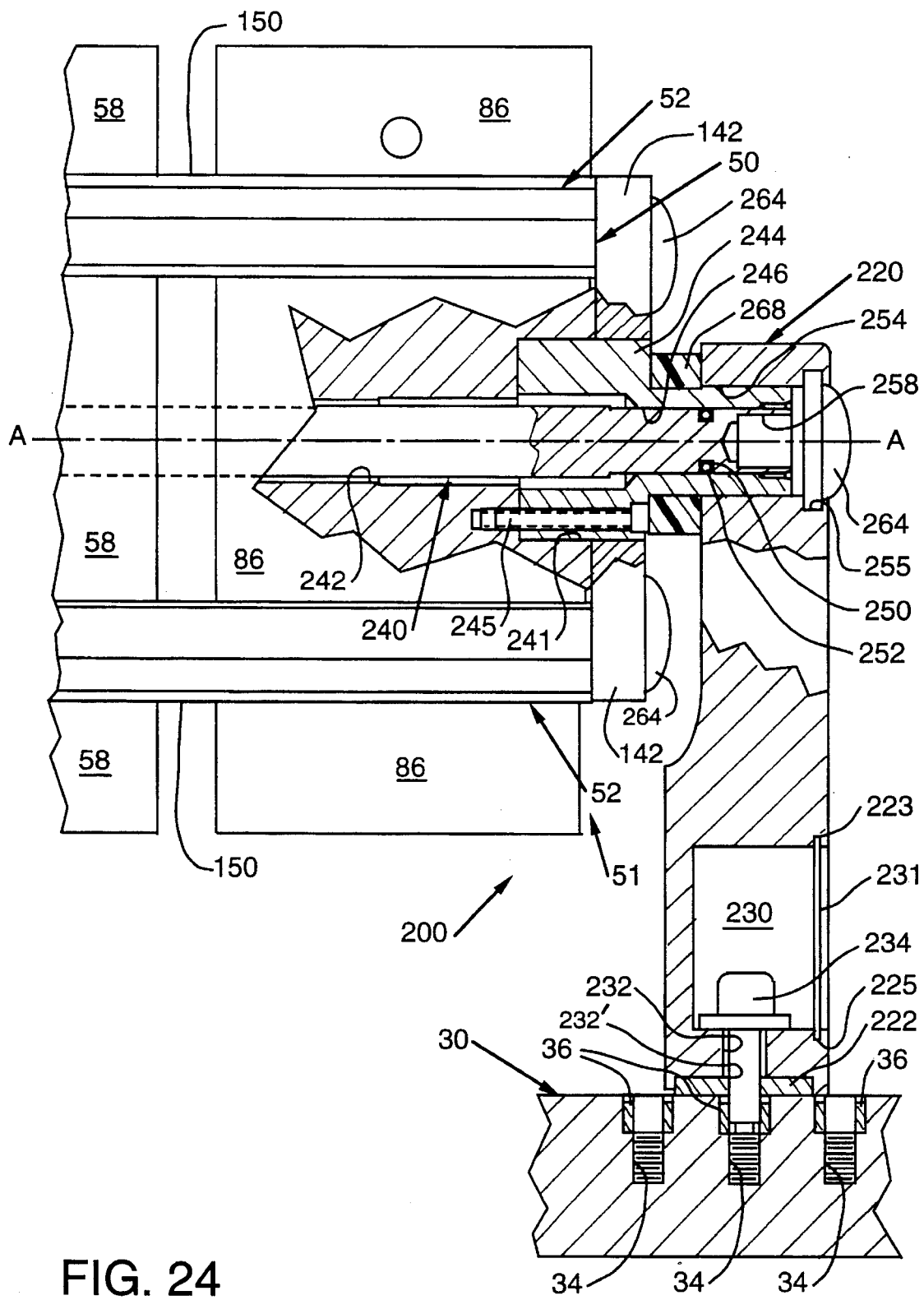
FIG. 24 is a partial cross-sectional assembly view of a column received on a preferred front support member of an indexable workholding apparatus of the present invention showing some of the elements thereof in full view for clarity.

To rotatably and axially mount the column 50 on the first and second upstanding support members 220 and 300, such that it can be selectively indexed about its longitudinal axis "A—A", the endcaps 140 and 148 must be removed. As can be seen in FIG. 24, a support shaft 240 is rotatably received within an axial bore 242 in the "front" end 51 of column 50 and is rotatably supported within the column member 50 by a shaft bushing 244. Shaft bushing 244 is preferably fabricated from bronze and is adapted to be non-rotatably received within a cavity 241 in the front end 51 of column 50. Preferably, shaft bushing 244 is rigidly attached to column 50 by a plurality of (preferably four) capscrews 245 and has an axial shaft receiving bore 246 into which shaft 240 is non-rotatably pressed. To prevent debris from infiltrating between the shaft 240 and the shaft bushing 244, shaft 240 is preferably provided with a annular groove 250 adapted to receive therein a commercially available resilient wiper member 252.

Shaft bushing 244 is also adapted to be rotatably received within a corresponding bore 254 provided in the upper portion of first support member 220. As can be seen in FIG. 24, the end of shaft 240 is preferably provided with a hexagonally shaped cavity 258 to receive a standard allen wrench or other tool to provide rotation to shaft 240 and ultimately to a ball screw member 332 that is operably supported within the support member 300 as will be discussed in further detail below to thereby cause column 50 to rotate about longitudinal axis "A—A". To prevent chips and debris from entering bore 254, an annular groove 255 is provided in the first support member 220 to retain a resilient endcap member 264 as shown in FIG. 24. In a preferred embodiment, all but one of the endcap members 264 that are attached to the endplates 142 are similarly colored. It will be appreciated that the "odd" colored endcap 164 indicates a "starting" or reference position to enable the operator to track the rotational position of the column member 50. Also, to further prevent chip and debris infiltration between the shaft bearing 244 and the bore 254 in the first support member 220, a resilient gasket member 268, preferably fabricated from foam rubber or other similar material, is provided around shaft bearing 244 as shown in FIG. 24.

Figure 25:
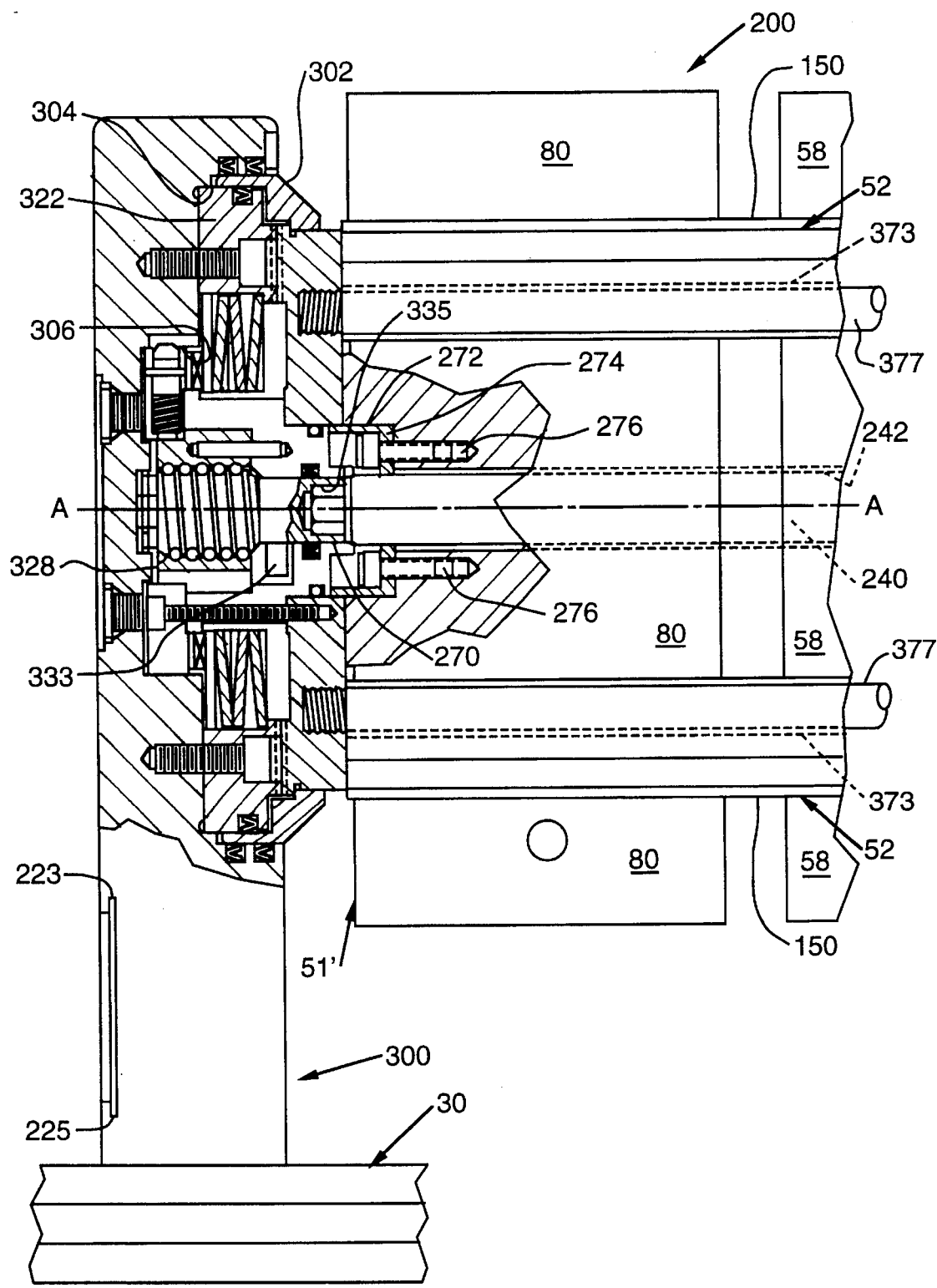
FIG. 25 is a partial cross-sectional assembly view of a column received on a preferred rear support member, with some of the elements thereof shown in full view for clarity.

As shown in FIG. 25, the opposite end of the shaft 240 protrudes from the end 51' of the column 50 and preferably has a hexagonal wrench portion 270 formed thereon. A cavity 272 is provided in column end 51' such that it is substantially coaxially aligned with the shaft 240 along axis "A—A". An alignment ring 274 is coaxially aligned within cavity 272 as shown in FIG. 25. Preferably, alignment ring 274 is retained within the cavity 272 by corresponding capscrews 276.

The second upstanding support member 300 is preferably fabricated from aluminum and is located on and attached to the grid plate 30 in the same manner that the first support member 220 is located on and attached to the grid plate 30. As can be seen in FIGS. 24-27, the second support member 300 has a plurality of coaxially aligned cavities (302, 304, 306), the purposes of which will be described in further detail below. For the purpose of precisely angularly locating the column 50 relative to the indexable support assembly 200 at preferred 5° increments with a preferred accuracy of approximately ± three arc-seconds, an indexing coupling 320 commonly known in the art as a "Curvic-type" or "Hirth-type" coupling is preferably used. The skilled artisan will appreciate, however, that other similarly constructed indexing couplings could also be successfully used. The indexing coupling 320 comprises a first indexing or toothed ring 322 and a second indexing or toothed ring 370 adapted for meshing engagement with the first toothed ring 322. As can be seen in FIGS. 24-27, the first toothed ring 322 is attached to the second support member 300, preferably by cap screws 324 and has two bores (326, 327) therein that are coaxially aligned on axis "A—A".

Figure 26:
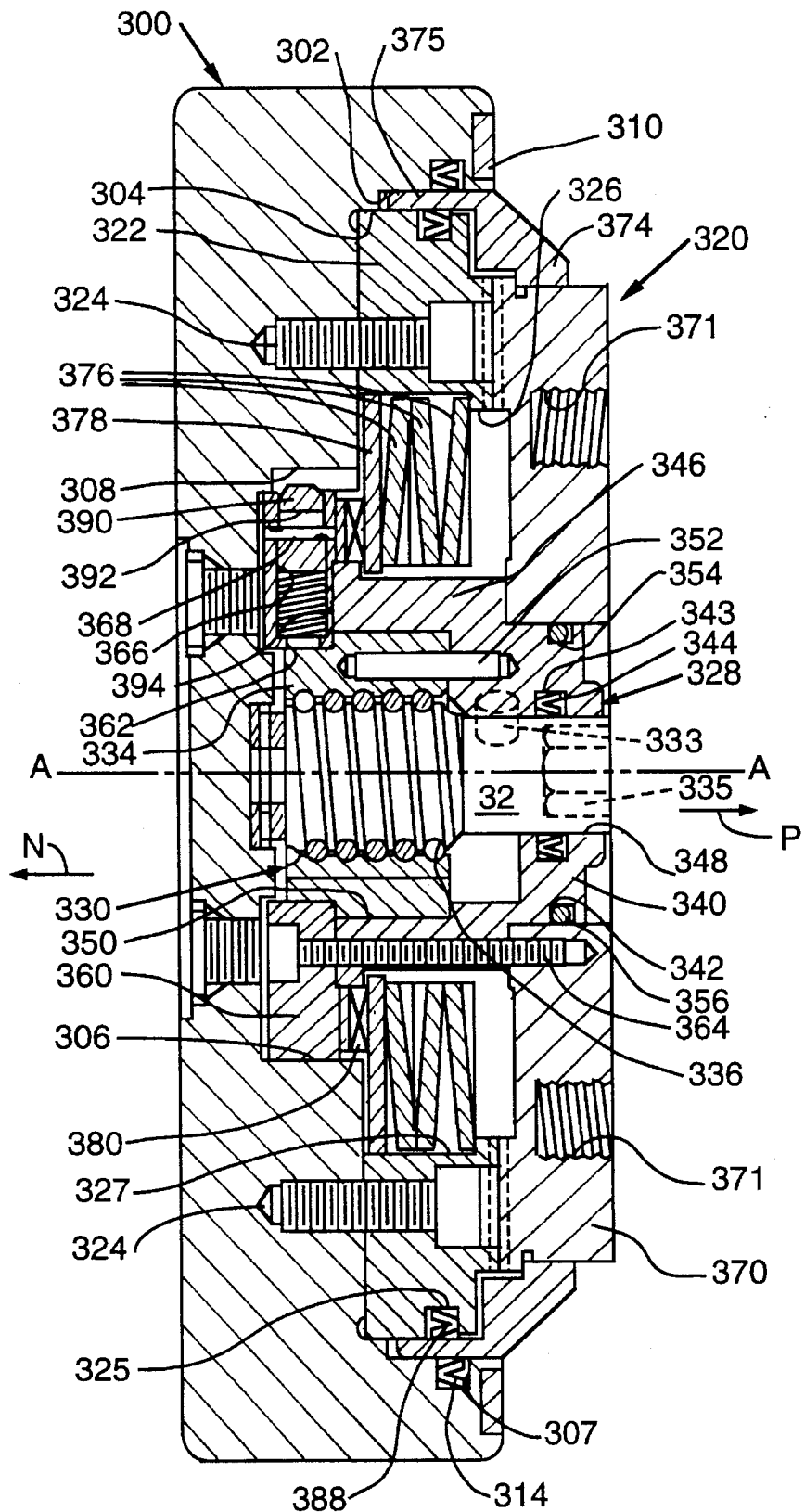
FIG. 26 is top cross-sectional view of the rear support member of FIG. 25 with the indexing assembly thereof in an engaged position.
Figure 27:
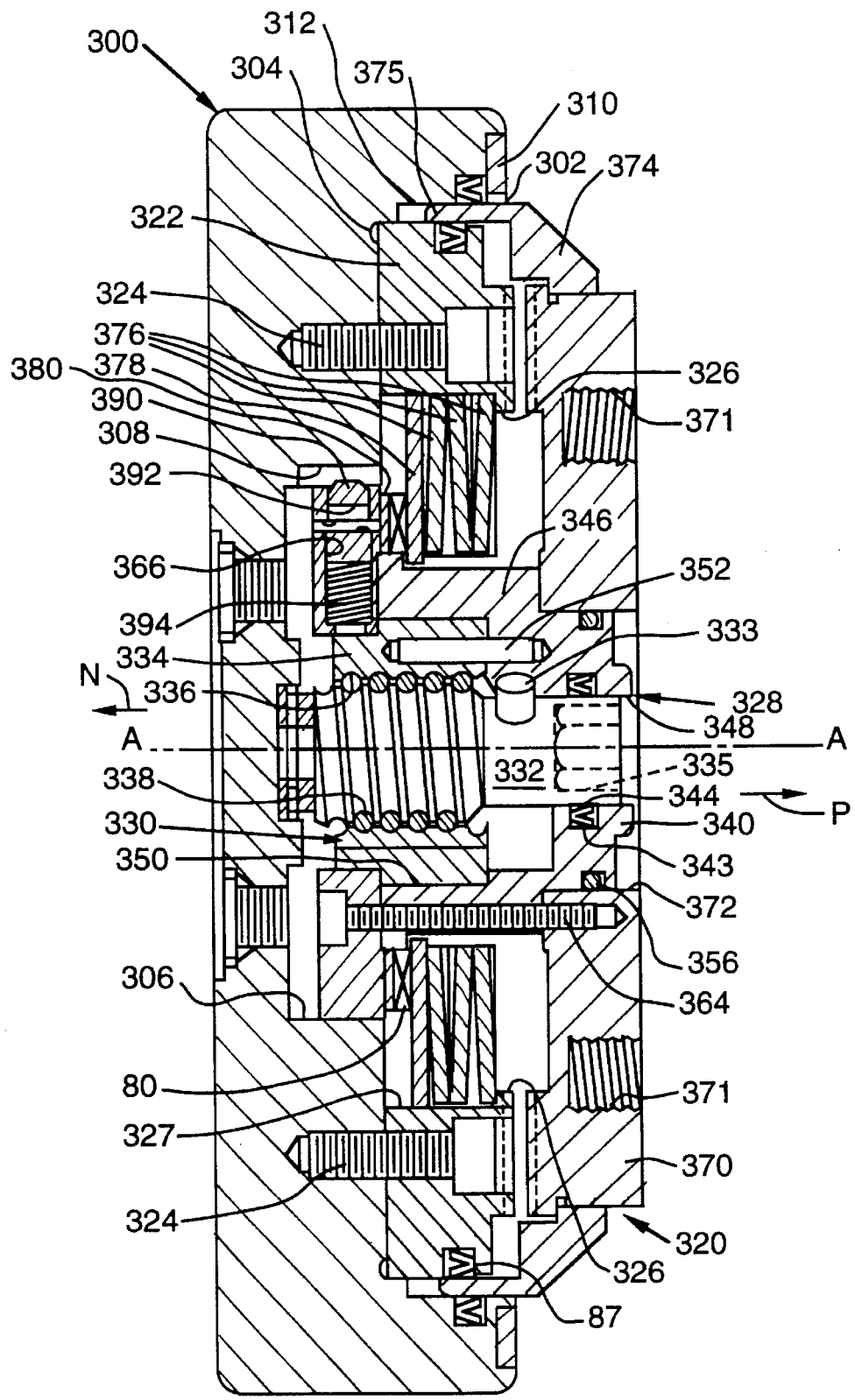
FIG. 27 is a cross-sectional view of the rear support member of FIGS. 25 and 26 with the indexing assembly thereof in a disengaged position.

Coaxially received within the bores (326, 327) is a indexing assembly, generally designated as 328. As can be seen in FIGS. 26 and 27, the indexing assembly 328 comprises, among other things, a ball screw assembly 330, a ball screw support ring 340 and a retaining plate assembly 360. The construction and operation of the ball screw assembly 330 is well known in the art and, therefore, will not be discussed in great detail herein. In general, however, the ball screw assembly 330 comprises a screw member 332 that is rotatably housed within a ball nut 334. The ball nut 334 and the ball screw member 332 have helical grooves therein that cooperate to form helical passages, generally designated as 336, that house a plurality of ball bearings 338 therein. Rotation of the screw member 332 will cause it to be axially advanced relative to the ball nut 334. In addition, screw member 332 has a radially extending engagement pin 333 attached thereto that, as will be discussed in further detail below, is designed to limit the rotation of the ball screw member 332 to an angular path of approximately 270° about axis "A—A". See FIG. 25.

The ball screw assembly 330 is supported within bore 306 of the second support member 300 by the ball screw support ring 340. In particular, as shown in FIGS. 26 and 27, the ball screw support ring 340 has a first hub portion 342 and a second hub portion 346. The first hub portion 342 has a first coaxial bore 348 therein that is sized to slidably and rotatably receive the screw member 332 and the second hub portion 346 has a second coaxial bore 350 that is sized to receive the screw nut 334. Ball nut 334 is non-rotatably attached to the ball screw support ring 340 preferably by pin 352. To prevent chips and other debris from becoming lodged between the first hub portion 342 and the screw member 332, a groove 343 is provided in the first hub portion 342 for receiving a commercially available resilient wiper member 344 therein.

As can also be seen in FIGS. 26 and 27, a retaining plate assembly 360 is received on the ball nut 334. In particular, the retaining plate assembly 360 has a bore 362 therethrough that is adapted to receive a portion of the screw nut 334 therein. A plurality of (preferably four) capscrews 364 serve to attach the retaining plate assembly 360 to the ball screw support ring 340. Also in a preferred embodiment, the second toothed ring 370 of the indexing coupling 320 has a bore 372 therethrough and is adapted to be coaxially received on the first hub portion 342 of the ball screw support ring 340 such that the teeth thereof are in a confronting intermeshing orientation with the teeth of the first toothed ring 322. To prevent chips and debris from entering between the bore 372 of the second toothed ring 370 and the first hub portion 342 of the ball screw support ring 340, a groove 354 is provided around the perimeter of the first hub portion 342 for housing an O-ring 356 therein.

The first and second toothed rings (322, 370) are preferably biased into meshing engagement by a plurality of Belleville washers 376 that are received on the second hub portion 346 as shown in FIGS. 26 and 27. Preferably three Belleville washers 376, sized to create a meshing force of approximately 2000 pounds, are coaxially received with a thrust washer 378 in bore 327 of the first toothed ring 322. As can also be seen in FIGS. 26 and 27, a bearing member 380 is received on the second hub portion 346 of the ball screw support ring 340 between the locking ring 360 and the thrust washer 378 to provide rotational support to the thrust washer 378 and, ultimately, to the indexing assembly 328.

As shown in FIGS. 24-27, the screw member 332 is provided with a hexagonal cavity 335 that is sized to receive the hexagonal shaped end 270 of the shaft 240 therein. As can be seen in FIG. 25, the column member 50 is non-rotatably attached to the second toothed ring 370 preferably by a plurality of (four) elongated screw members 377 that extend through corresponding longitudinal bores 373 in the column member 50 to be threadedly received in corresponding threaded bores 371 in the second toothed ring 370. The skilled artisan will appreciate, however, that the column member 50 may be removably and non-rotatably attached to the second toothed ring 370 by a myriad of other suitable fastener arrangements. It will be further appreciated that alignment ring 274, in cooperation with bore 372 in the second toothed ring 370, serves to assist in the attachment of the column 50 to the second toothed ring 370.

Also in a preferred embodiment, to provide an indication of the angular position of column 50 about axis "A—A", an angular scale member 374 is attached to the perimeter of the second toothed ring 370 such that it travels therewith. The scale member 374 is also preferably provided with an annular portion 375 that is adapted to be selectively received within an annular space 312 between the inner surface of cavity 302 and the outer perimeter of the first toothed ring 322. See FIG. 27. In addition, one or more angular indicators 310 are preferably attached to the second support member 330 and cooperate with the scale member 374 to provide the operator with a visual indication of the angular position of the second toothed ring 370 and, ultimately, column 50.

Preferably received within an annular groove 307 in the second support member 300 is a commercially available wiper member 314. A second wiper member 388 is received in a groove 325 in the perimeter of the first toothed ring 322. As will be discussed in further detail below, wipers (314, 388) serve a two-fold purpose; namely, to prevent chips and debris from entering annular space 312 and to provide a sufficient amount of frictional force to retain the second toothed ring 370 in a momentary "disengaged" position as the ball screw member 332 is being rotated through the final portion of its radial path.

The operation of the indexable workholding apparatus 200 is, essentially, a two step process and can be understood from reference to FIGS. 24-27. FIG. 26 illustrates the indexing assembly 328 in an "engaged" position wherein the first and second toothed rings (322, 370) are biased into meshing engagement by the Belleville springs 376. Thus, to index the column 50, the second toothed ring 370 must first be axially advanced out of meshing engagement with the first toothed ring 322. To accomplish that task, a hex wrench or other similar tool is inserted through the slit 266 in the endcap 264 received within bore 254 and inserted into the corresponding cavity 258 in the shaft 240. Thereafter, the shaft is rotated in a clockwise direction (depicted by arrow "M" in FIG. 20). The initial rotation of the shaft 240 in a clockwise direction causes the ball screw member 332 to also rotate in a clockwise direction. The ball screw member 332 is rotated through a preferred 270° path of rotation that is limited by the engagement of the engagement pin 333 with a portion of the first hub member 340. Because the axial motion of the ball screw member 332 is restrained in the "N" direction by the support member 300, such rotation of the ball screw member 332 causes the ball nut 334 to axially advance in the "P" direction thus disengaging the second toothed ring 370. In a preferred embodiment, the ball screw assembly 330 is so arranged such that, just prior to the engagement of the engagement pin 333 with the first hub portion 342 (i.e., when the ball screw member 332 has rotated through a path of approximately 2500), the ball screw member 332 will have axially advanced the ball nut 334 in a "P" direction against the force generated by the Belleville springs 376 to thereby cause the first and second toothed rings (322, 370) to be disengaged. See FIG. 27. It will be appreciated that the ball screw assembly 330 is sized to provide the requisite mechanical advantage to sufficiently compress the Belleville springs 376 to permit the second toothed ring 370 to be biased out of meshing engagement. As was mentioned above, Belleville springs 376 are preferably sized to provide approximately 2000 pounds of meshing force to the first and second toothed rings (322, 370). However, the Belleville springs 376 and the ball screw assembly 330 may be appropriately sized to provide any other suitable meshing force.

In a preferred embodiment, the wipers (314, 388) are sized and so positioned relative to the annular portion 375 of the scale 374 to create an amount of frictional force therebetween (i.e., ten foot-pounds) that is somewhat greater than the rotational force required to operate the ball screw member 332. These frictional forces serve to overcome the forces required to operate the ball screw 332 including the forces created by the Belleville springs 376 which would otherwise cause the second toothed ring 370 to axially move in the "N" direction and possibly contact the first toothed ring member 322 while the ball screw member 332 is further rotated through the final portion of its preferred 270° path (i.e., until the engagement pin 333 engages the first hub 342). When the engagement pin 333 engages the first hub 342, it causes the indexing assembly 328 to be selectively rotated on the bearing 380 and thereby, by virtue of its connection to the second toothed ring 370, causes the second toothed ring 370 and, ultimately, the column member 50 to be rotated about the axis "A—A". It will be understood that while the frictional force generated by the wipers (314, 388) is sufficient to overcome the rotational force required to operate the ball screw member 332, such frictional force may be easily overcome by the further manual application of rotary force on the ball screw member 332. After the column 50 has been rotated to the desired orientation, the shaft 240 is slowly permitted to turn in the direction depicted by arrow "Q" in FIG. 20 under the biasing force of the Belleville springs 376 which cause the second toothed ring 370 to re-engage the first toothed ring 322 and, thus, rigidly retains the column 50 in that position.

In a preferred embodiment, the cavity 306 in the second support member 300 is provided with engagement notches 308 therein preferably arranged at 90° intervals; however, any number of engagement notches 308 may be provided in the inner wall of the cavity 306. The engagement notches 308 are adapted to receive therein one or more spring biased detent pins 390 that are received within the retaining plate assembly 360. More particularly and with reference to FIGS. 26 and 27, one or more radial bores 366 are provided in the outer perimeter of the retaining plate assembly 360 and are sized to slidably receive therein a corresponding detent pin 390. Preferably, each detent pin 390 has an oversized transverse bore 392 therethrough that is adapted to receive a transverse pin member 368 attached to the retaining plate assembly 360 as shown in FIGS. 26 and 27. The reader will appreciate that the transverse pin 368 serves to movably retain the detent pin 390 within the radial bore 366. A coil spring 394 is provided between the detent pin 390 and the bottom of the bore 366 to bias the detent pin 390 in an outward radial direction to engage an engagement notch 308 in the second support member 300. It will be appreciated that when the end of the detent pin 390 is received within one of the notches 308, the indexing assembly 328 is further locked in that radial position. Preferably, the end of the detent pin 390 is substantially rounded such that it can be biased out of engagement with a notch 308 when the indexing assembly 328 is rotatably actuated.

Accordingly, the present invention provides solutions to the aforementioned problems associated with prior modular fixturing systems. In particular, the above-described components can be used to create various workholding assemblies to address a variety of different workholding problems while serving to further maximize the use of the machining envelope of a machining apparatus. In addition, only a few of the present workholder components are needed to create a very flexible workholding system. Thus, a great number of different and expensive dedicated workholding devices are not required in order to maintain the ability to support a variety of different workpieces within the machining envelope. While such advantages are apparent from the foregoing disclosure, it will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. A workholding system adapted to be supported on a support member, comprising:

at least one clamping assembly having at least one pair of jaws for clamping at least one workpiece therebetween, wherein each said clamping assembly comprises first and second movable support members operably interconnected by means for moving said jaws such that said first and second movable support members can be selectively moved toward and away from one another, each said first and second movable support members having first and second extended portions, respectively, and one said jaw being attached to said first extended member and the other said jaw being attached to said second extended member;

at least one first base member attached to said support member, each said first base member having means for operably receiving at least one said clamping assembly therein;

at least one longitudinal column member attached to said support member, each said longitudinal column member having at least two longitudinal column surfaces that are substantially parallel, each said longitudinal column surface having a second longitudinal cavity thereunder for operably supporting therein corresponding said first and second movable members such that said first and second extended portions thereof extend out of each corresponding said second longitudinal cavity, a second center jaw removably attached to at least one said longitudinal column surface and a primary jaw member corresponding to at least one said first extended portion and being removably attached thereto and a secondary jaw member corresponding to at least one said second extended portion and being removably attached thereto; and means for removably attaching said longitudinal column member to said support member.

2. The workholding system of claim 1 wherein said means for attaching said longitudinal column member to the support member comprises:

an adaptor member attached to the support member in a predetermined orientation, said adaptor member having a receiving surface adapted to receive in confronting relationship another longitudinal column surface, said receiving surface having first and second cavities therein adapted to receive the first and second extended portions corresponding to the longitudinal column surface received thereon;

locating means for locating the longitudinal column surface received on said receiving surface in a predetermined confronting orientation relative to said receiving surface; and means for removably attaching the first and second extended members received within said first and second cavities, respectively, to said adaptor member.

3. The workholding system of claim 1 wherein said means for attaching said longitudinal column member to the support member includes a selectively indexable support assembly comprising:

first and second upstanding support members for rotatably and axially supporting said longitudinal column member therebetween for selective axial and rotational movement; and an indexing assembly attached to said second support member and communicating with said longitudinal column member, said indexing assembly having indexing means for selectively axially displacing said longitudinal column member to a disengaged position when a rotary force is initially applied thereto and permitting said longitudinal column member to thereafter be selectively rotated to a predetermined angular position upon the further application of said rotary force thereto and selectively retaining said longitudinal column member in said predetermined angular position when said further application of rotary force is discontinued.

4. A workholding system comprising:

a plate member having holes therein in the form of a grid;

a plurality of clamping assemblies, each said clamping assembly having first and second movable support members, said first and second movable support members having first and second extended portions, respectively, a first movable jaw member attached to said first extended portion and a second movable jaw member attached to said second extended portion, said first and second movable members being operably interconnected by means for selectively moving said first and second jaw members toward and away from each other;

a first base member attached to said plate member, said first base member having a first longitudinal surface and means for operably receiving a said clamping assembly therein and a first center jaw attached to said first longitudinal surface such that said first and second movable jaw members may be selectively advanced toward and away from said center jaw to restrain at least one workpiece therebetween;

a column member having a first axis and a plurality of longitudinal column surfaces that are substantially parallel to said first axis, at least one said longitudinal column surface having means for operably receiving a said clamping assembly therein and a second center jaw removably attached to said at least one longitudinal column surface such that the corresponding first and second movable jaw members may be selectively advanced toward and away from the corresponding second center jaw to restrain at least one workpiece therebetween and another longitudinal column surface having a longitudinal cavity thereunder for operably supporting therein corresponding said first and second movable members and said means for moving such that the first and second extended portions thereof extend from said cavity and an adaptor member attached to said plate in a predetermined orientation, said adaptor member having a receiving surface adapted to receive in confronting relationship said another longitudinal column surface, said receiving surface having first and second cavities therein adapted to receive the first and second extended portions corresponding to said another longitudinal column surface and locating means for locating said another column surface received on said receiving surface in a predetermined confronting orientation relative to said receiving surface, and means for removably attaching the first and second extended members received within said first and second cavities, respectively, to said adaptor member;

at least one other longitudinal column member having a second axis and a plurality of longitudinal column surfaces that are substantially parallel to said second axis, each said longitudinal column surface having means for receiving a said clamping assembly therein, and a third center jaw attached to each said longitudinal surface such that the corresponding said first and second movable jaw members may be selectively advanced toward and away from said third center jaw to restrain at least one workpiece therebetween and corresponding first and second upstanding support members for rotatably and axially supporting said other longitudinal column member therebetween for selective axial and rotational movement with respect to said second axis and an indexing assembly attached to said second support member and communicating with said other longitudinal column member, said indexing assembly selectively axially displacing said other longitudinal column member to a disengaged position when a rotary force is initially applied thereto and permitting said other longitudinal column member to thereafter be selectively rotated to a predetermined angular position upon the further application of said rotary force to said indexing assembly and selectively retaining said other longitudinal column member in said predetermined axial angular position when said further application of rotary force is discontinued.

* * * * *